(12) United States Patent
Otaguro

(10) Patent No.: US 7,855,521 B2
(45) Date of Patent: Dec. 21, 2010

(54) MOTOR DRIVE CIRCUIT

(75) Inventor: Yoshitaka Otaguro, Kyoto (JP)

(73) Assignee: Rohm Co., Ltd. (JP)

( * ) Notice: Subject to any disclaimer, the term of this patent is extended or adjusted under 35 U.S.C. 154(b) by 453 days.

(21) Appl. No.: 12/048,399

(22) Filed: Mar. 14, 2008

(65) Prior Publication Data

US 2008/0252238 A1 Oct. 16, 2008

(30) Foreign Application Priority Data

Mar. 16, 2007 (JP) ............................. 2007-069573
Mar. 16, 2007 (JP) ............................. 2007-069576

(51) Int. Cl.
*E05B 65/12* (2006.01)
(52) U.S. Cl. .................. 318/4; 318/400.05; 318/400.06
(58) Field of Classification Search ...................... 318/4, 318/400.05, 400.06, 400.35, 599
See application file for complete search history.

(56) References Cited

U.S. PATENT DOCUMENTS

2003/0075997 A1* 4/2003 Keim et al. ............... 310/68 D

FOREIGN PATENT DOCUMENTS

| JP | 3-207250 A | 9/1991 |
| JP | 10-243685 A | 9/1998 |
| JP | 11-75388 A | 3/1999 |

* cited by examiner

*Primary Examiner*—Karen Masih
(74) *Attorney, Agent, or Firm*—Cantor Colburn LLP

(57) ABSTRACT

A pulse generation unit generates a PWM signal whose duty ratio changes according to a target torque of a motor. A back electromotive detection circuit compares a back electromotive voltage generated at a coil of the motor with a middle point voltage of the coil, and outputs a back electromotive detection signal that becomes high level at a timing of the zero crossing point. A phase adjustment unit compares phases of the back electromotive detection signal and a reference signal that becomes a predetermined level at a predetermined timing, and adjusts the duty ratio of the PWM signal by feedback so that the phase error becomes a minimum. A frequency adjustment unit adjusts the frequency of the PWM signal such that the frequency of the PWM signal becomes integral multiples of the frequency of the back electromotive detection signal.

19 Claims, 13 Drawing Sheets

FIG.1A  PWM 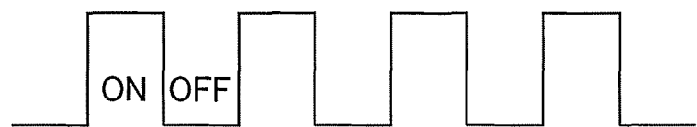
FIG.1B  Vu, Vcom 
FIG.1C  BEMF_EDGE 

FIG. 3A  SIN_U 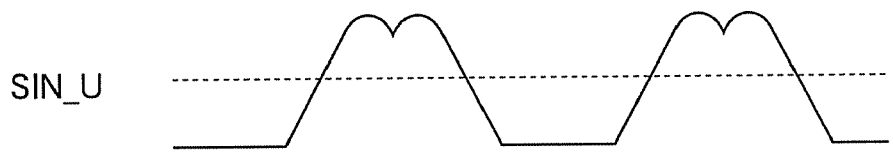
FIG. 3B  SIN_V 
FIG. 3C  SIN_W 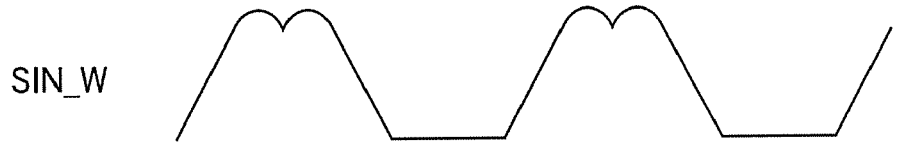
FIG. 3D  BEMF_EDGE 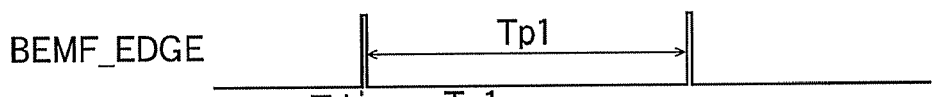
FIG. 3E  DRV 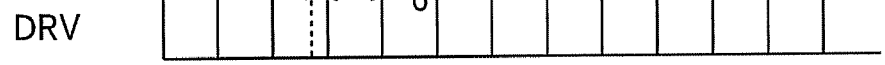
FIG. 3F  WINDOW 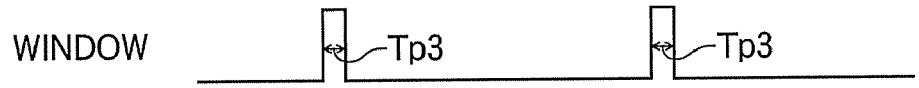
FIG. 3G  DRV_HU 
FIG. 3H  DRV_HV 
FIG. 3I  DRV_HW 
FIG. 3J  DRV_LU 
FIG. 3K  DRV_LV 
FIG. 3L  DRV_LW 

FIG. 5A CNT, TRQ2 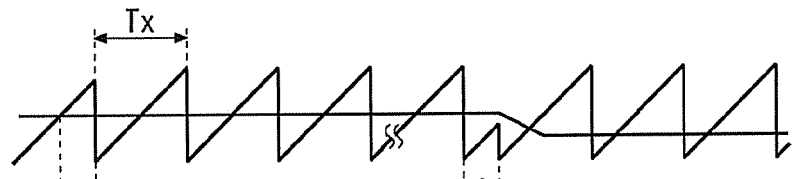
FIG. 5B Spwm 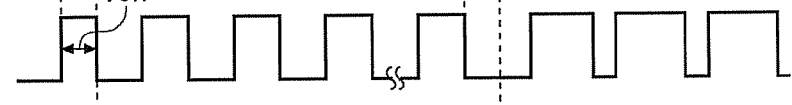
FIG. 5C MSK 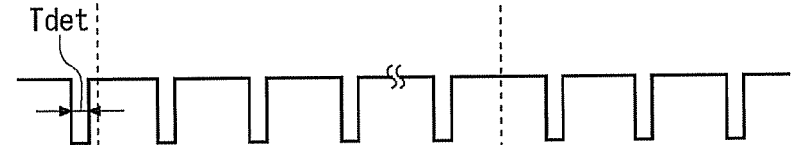
FIG. 5D REF 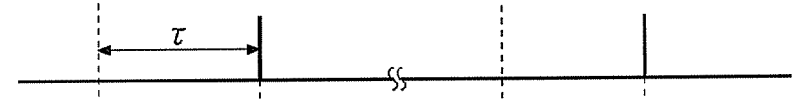
FIG. 5E Vu, Vcom 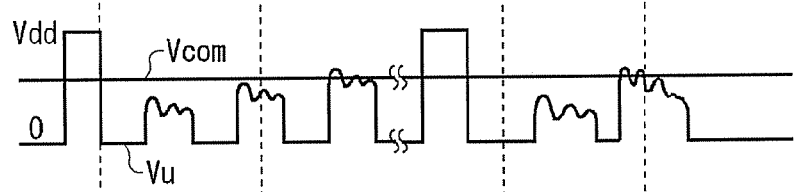
FIG. 5F Scmp 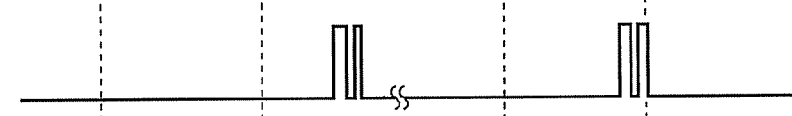
FIG. 5G BEMF_EDGE 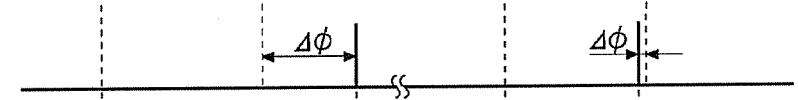
FIG. 5H FRCNT 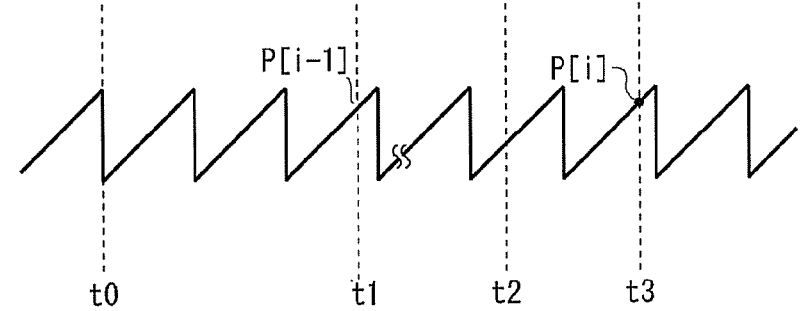

FIG.10A CNT, TRQ2 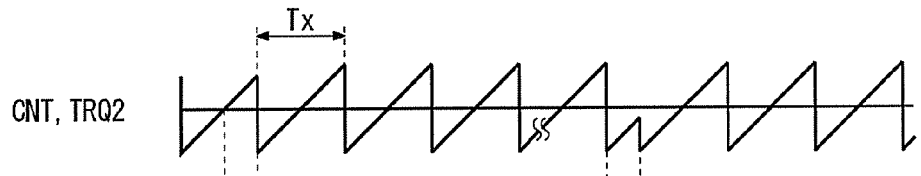
FIG.10B Spwm 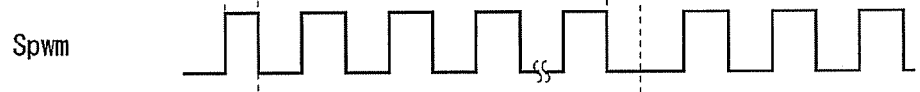
FIG.10C MSK 
FIG.10D REF 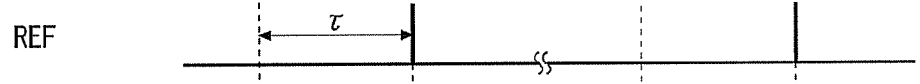
FIG.10E Vu, Vcom 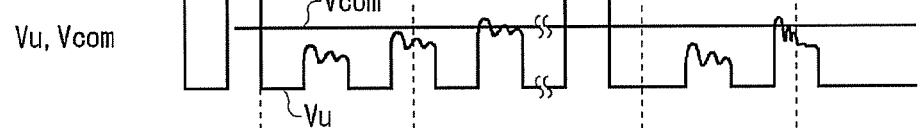
FIG.10F Scmp 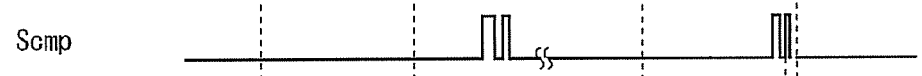
FIG.10G BEMF_EDGE 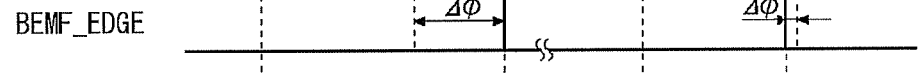
FIG.10H FRCNT 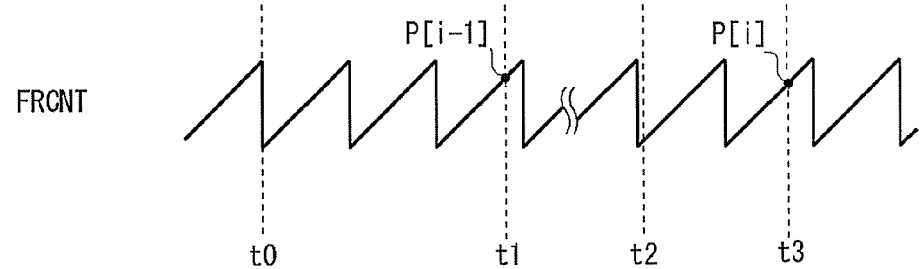

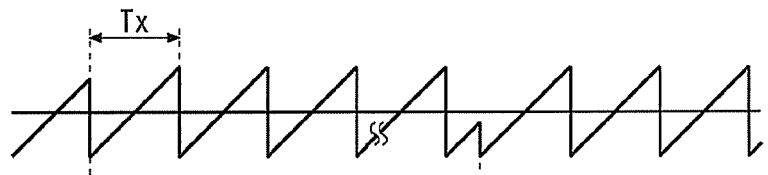
FIG.12A  CNT, TRQ
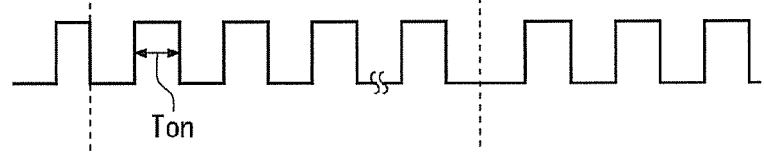
FIG.12B  Spwm
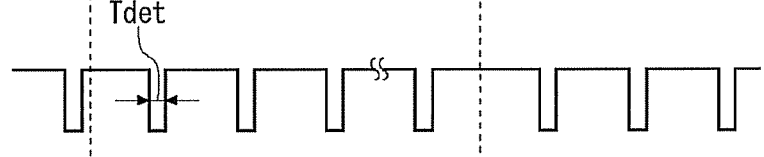
FIG.12C  MSK
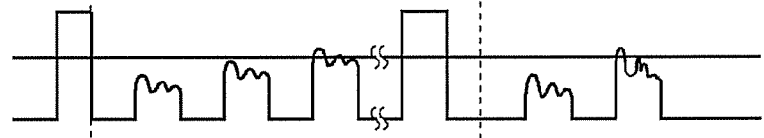
FIG.12D  Vu, Vcom
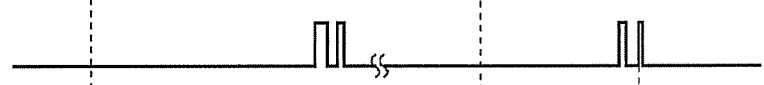
FIG.12E  Scmp
FIG.12F  BEMF_EDGE
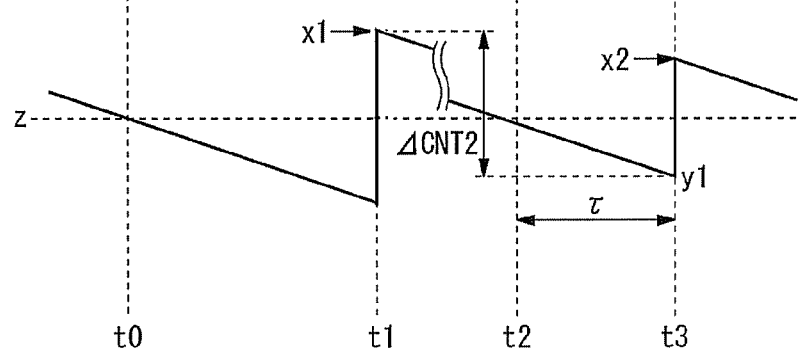
FIG.12G  CNT2

MOTOR DRIVE CIRCUIT

BACKGROUND OF THE INVENTION

1. Field of the Invention

The present invention relates to a motor drive circuit for controlling a sensorless motor.

2. Description of the Related Art

In electronic equipments using a disc media such as portable CD (Compact Disc) apparatus and DVD (Digital Versatile Disc), a brushless DC (direct current) motor for rotating the disc is used. The brushless DC motor generally includes a rotor with a permanent magnet, and a stator with coils of a plurality of phases that are star wire connected, where the coil is magnetized by controlling the electric current to be supplied to the coil, and the rotor is relatively rotated and driven with respect to the stator. The brushless DC motor generally includes a sensor such as Hall element and optical encoder to detect a rotation position of the rotor, where the current to be supplied to the coil of each phase is switched according to the position detected by the sensor, and an appropriate torque is applied to the rotor.

A sensorless motor for detecting the rotation position of the rotor without using a sensor such as Hall element is proposed to further miniaturize the motor (see e.g., patent documents 1, 2). The sensorless motor monitors a potential of the middle point wiring of the motor (hereinafter referred to as middle point voltage) and a back electromotive voltage (induced voltage) generated at one end of the coil, and obtains position information by detecting a zero crossing point in which the voltage becomes equal to the middle point voltage.

[Patent document 1] Japanese Patent Application (Laid-Open) No. H3-207250

[Patent document 2] Japanese Patent Application (Laid-Open) No. H10-243685

[Patent document 3] Japanese Patent Application (Laid-Open) No. H11-75388

FIGS. 1A to 1C are time charts showing a state of detecting the zero crossing point in pulse modulation drive. FIG. 1A shows a waveform chart of a pulse modulated signal PWM, FIG. 1B shows a waveform chart of a phase voltage (hereinafter also referred to as back electromotive voltage Vu) and a middle point voltage Vcom generated at the coil acting as a detection target of the zero crossing point, and FIG. 1C shows a waveform chart of a back electromotive detection signal BEMF_EDGE. In FIGS. 1A to 1C, the voltage to be applied to the coil of the motor is controlled through pulse modulation in an aim of continuously changing the current to be flowed to the coil of the motor in sinusoidal wave form or arch form.

As shown in FIG. 1B, noise component appears at a timing of transition from OFF to ON or at a timing of ON to OFF of the pulse modulated signal shown in FIG. 1A in the back electromotive voltage Vu generated at the coil that acts as a detection target of the zero crossing point. Due to such noise component, the back electromotive detection signal obtained by comparing the phase voltage Vu and the middle point voltage Vcom repeat high level and low level, and the zero crossing point is mistakenly detected. The mistaken detection of the zero crossing point is a mistaken detection of the position of the rotor, and causes problems such as degradation of rotation accuracy and rotation failure.

SUMMARY OF THE INVENTION

In view of the above problems, the general purpose of the present invention is to provide an accurate detection technique of a zero crossing point when pulse modulating and driving a motor.

One embodiment of the present invention relates to a motor drive circuit which supplies drive current and drives a multi-phase motor. The motor drive circuit includes a plurality of switching circuits provided for respective coils of the multi-phase motor and operative to apply a voltage of high level or low level to one end of the coil; a pulse modulation signal generation unit which generates a pulse modulation signal whose duty ratio changes according to a target torque of the multi-phase motor, and outputs a reference signal that becomes a predetermined level at a predetermined timing; a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point; a switching control unit which receives the pulse modulation signal from the pulse modulation signal generation unit and the back electromotive detection signal from the back electromotive detection circuit, and switch controls at least one of a high side switch and a low side switch contained in the switching circuit to be driven based on the back electromotive detection signal; and a pulse adjustment unit which adjusts a frequency of the pulse modulation signal based on the reference signal and the back electromotive detection signal.

Another embodiment of the present invention relates to a motor drive circuit which supplies drive current and drives a multi-phase motor. The motor drive circuit includes a plurality of switching circuits provided for respective coils of the multi-phase motor and operative to apply a voltage of high level or low level to one end of the connected coil; a pulse modulation signal generation unit which generates a pulse modulation signal whose duty ratio changes according to a target torque of the multi-phase motor; a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point; a switching control unit which receives the pulse modulation signal from the pulse modulation signal generation unit and the back electromotive detection signal from the back electromotive detection circuit, and performs sequence control of switching phases to be driven based on the back electromotive detection signal and switch controls at least one of a high side switch and a low side switch contained in the switching circuit to be driven based on the pulse modulation signal; and a phase adjustment unit which compares phases of the back electromotive detection signal from the back electromotive detection circuit and the reference signal that becomes the predetermined level at the predetermined timing, and adjusts the duty ratio of the pulse modulation signal by feedback so that a phase error of the two signals becomes a minimum; and a frequency adjustment unit which receives the back electromotive detection signal and adjusts a frequency of the pulse modulation signal so that the frequency of the pulse modulation signal becomes integral multiples of the frequency of the back electromotive detection signal.

"Pulse modulation" refers to a modulation using a signal whose ratio of the period of high level and low level of the pulse, that is, the duty ratio changes such as pulse width modulation (PWM), pulse frequency modulation (PFM), and pulse position modulation (PPM).

According to the above embodiment, the feedback is applied such that the frequency of the back electromotive detection signal and the frequency of the pulse modulation signal are integral multiples, and the timing of zero crossing point indicated by the back electromotive detection signal coincides with the timing of the reference signal. Therefore, the timing of the zero crossing point can be accurately detected with slight delay by setting the timing of detecting the zero crossing point near the timing of the reference signal.

The phase adjustment unit may include a phase error detector which detects the phase error of the reference signal and the back electromotive detection signal, and a torque adjustment unit which reflects the phase error detected by the phase error detector on the target torque.

In this case, the duty ratio of the pulse modulation signal can be adjusted by adjusting the target torque so that the phase error becomes small, and the timing at which the back electromotive signal becomes a predetermined level can be changed.

The pulse modulation signal generation unit may include a counter which repeats a count-up or a count-down operation at a predetermined cycle shorter than a cycle of the back electromotive detection signal. The pulse modulation signal generation unit may generate the pulse modulation signal whose level transitions according to a magnitude relation of a count value by the counter and a value of a torque signal indicating the target torque. The frequency adjustment unit set operates the counter so that the frequency of the pulse modulation signal becomes integral multiples of the frequency of the back electromotive detection signal. The term "set the counter" means setting the counter value to an initial value.

In this case, the pulse modulation signal pulse width modulated by slicing with the value of the torque signal can be generated since the count value has as saw-tooth waveform. The number of vertex of the saw-tooth wave corresponds to the frequency of the pulse modulation signal, and thus the desired operation can be realized by setting the counter so that an integer number of saw-tooth waves are contained in one cycle of the back electromotive detection signal.

The frequency adjustment unit may include a free run counter which operate at a cycle same as the counter; a frequency error detector which monitors a count value $P[i]$ of the free run counter at a time the back electromotive detection signal becomes a predetermined level in the $i^{th}$ ($i$ is an arbitrary natural number) time, calculates every time a difference $\Delta P[i]=P[i]-P[i-1]$ with a count value $P[i-1]$ of the free run counter at a time the back electromotive detection signal becomes a predetermined level in the previous $(i-1)^{th}$ time, and calculates a frequency error $\delta F[i]=\Delta P[i]-\Delta P[i-1]$ indicated by a current difference $\Delta P[i]$ and the previous difference $\Delta P[i-1]=P[i-1]-P[i-2]$; and a counter setting unit which sets the counter at a timing based on the frequency error $\delta F[i]$ calculated by the frequency error detector.

The free run counter repeats count-up and count-down at the same cycle without being set. If the motor rotates at a constant revolution, the time interval (i.e., frequency) that becomes a predetermined level of the back electromotive detection signal is constant. Therefore the difference $\Delta P$ of the count value is constant when the revolution of the motor is constant. Conversely, the difference $\Delta P$ which is monitored changes when the revolution of the motor changes.

According to the embodiment, the fluctuation in the frequency (revolution of motor) of the back electromotive detection signal can be monitored, and the timing of setting the counter is adjusted according to the fluctuation, so that the frequency of the pulse modulation signal is set to integral multiples of the frequency of the back electromotive detection signal.

The motor drive circuit of one embodiment may further include a mask signal generation unit which generates a mask signal that becomes a predetermined level and validates a detection of a zero crossing point by the back electromotive detection circuit during a detection period in an ON period in which the pulse modulation signal is at a level indicating an ON state of at least one of the high-side switch and the low-side switch contained in the switching circuit; and a reference signal generation unit which generates the reference signal that becomes the predetermined level during the detection period the detection of the zero crossing point is validated by the mask signal.

In this case, the timing the back electromotive detection signal becomes a predetermined level can be shifted during the period the detection of the zero crossing point is valid, and thus the detection delay etc. of the zero crossing point can be reduced.

The motor drive circuit may be monolithically integrated on one semiconductor substrate. "Monolithically integrate" includes a case of forming all the components of the circuit on the semiconductor substrate and a case of monolithically integrating the main components of the circuit, where some resistors and capacitors for adjustment of circuit constant can be provided exterior to the semiconductor substrate. The circuit area is reduced by integrating the motor drive circuit as one LSI.

Another embodiment of the present invention relates to a disc apparatus. The apparatus includes a spindle motor which rotates the disc and the motor drive circuit described above which drives the spindle motor.

According to such embodiment, the zero crossing point by the motor drive circuit can be accurately detected, and the spindle motor can be stably rotated.

Another further embodiment of the present invention is a motor drive method. The method is a motor drive method of supplying drive current and driving a multi-phase motor; the method including generating a pulse modulation signal whose duty ratio changes according to a target torque of the multi-phase motor; detecting a zero crossing point by comparing a back electromotive voltage generated in at least one coil of the multi-phase motor with a middle point voltage of the coil, and generating a back electromotive detection signal that becomes a predetermined level at a timing of the zero crossing point; performing sequence control of switching phases to be driven based on the back electromotive detection signal and switch controlling at least one of a high side switch and a low side switch connected to the coil based on the pulse modulation signal; generating a reference signal that becomes a predetermined level at a predetermined timing in one cycle of the back electromotive detection signal; comparing phases of the back electromotive detection signal and the reference signal and adjusting the duty ratio of the pulse modulation signal by feedback so that a phase error of the two signals becomes a minimum; and adjusting a frequency of the pulse modulation signal so that the frequency of the pulse modulation signal becomes integral multiples of the frequency of the back electromotive detection signal.

Another embodiment of the present invention relates to a motor drive circuit which supplies drive current and drives a multi-phase motor. The motor drive circuit includes a plurality of switching circuits provided for respective coils of the multi-phase motor and operative to apply a voltage of high level or low level to one end of the connected coil; a pulse modulation signal generation unit which generates a pulse modulation signal whose duty ratio changes according to a target torque of the multi-phase motor; a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point; a switching control unit which receives the pulse modulation signal from the pulse modulation signal generation unit and the back electromotive detection signal from the back electromotive detection circuit, and performs sequence control of switching phases to be driven based on the back electromotive detection signal and switch controls at least one of a high side switch or a low side switch contained in the switching circuit to be driven based on the pulse modulation signal; and a pulse adjustment unit which compares a timing the back electromotive detection signal becomes the predetermined level with a predetermined reference timing, and adjusts a frequency and a phase of the pulse modulation signal so that a phase error of the two timings becomes a minimum and the frequency of the pulse modulation signal becomes integral multiples of the frequency of the back electromotive detection signal.

"Pulse modulation" refers to a modulation using a signal whose ratio of the period of high level and low level of the pulse, that is, the duty ratio changes such as pulse width modulation (PWM), pulse frequency modulation (PFM), and pulse position modulation (PPM).

According to the above embodiment, the feedback is applied and the frequency and the phase of the pulse modulation signal are adjusted such that the frequency of the back electromotive detection signal and the frequency of the pulse modulation signal are integral multiples, and the timing of zero crossing point indicated by the back electromotive detection signal coincides with the timing of the reference signal. Therefore, the zero crossing point can be accurately detected with slight delay by setting the timing of detecting the zero crossing point near the timing of the reference signal.

The pulse adjustment unit may include a frequency error detector which detects a frequency of every time of the back electromotive detection signal, and generates frequency error data corresponding to the error, and a phase error detector which detects a phase error of a timing at which the back electromotive detection signal becomes the predetermined level and the predetermined reference timing, and generates phase error data corresponding to the phase error; and the frequency and the phase of the pulse modulation signal are adjusted based on the frequency error data and the phase error data.

The pulse modulation signal generation unit may include a modulation counter which repeats a count-up or a count-down operation at a predetermined cycle shorter than a cycle of the back electromotive detection signal, and generates a pulse modulation signal whose level transitions according to a magnitude relation of the count value by the modulation counter and a value of a torque signal indicating the target torque. The pulse adjustment unit may include a counter setting unit which sets the modulation counter at a timing based on the frequency error data and the phase error data.

The term "set the counter" means setting the count value to an initial value.

In this case, the pulse modulation signal pulse width modulated by slicing with the value of the torque signal can be generated since the count value has as saw-tooth waveform. The number of vertex of the saw-tooth wave corresponds to the frequency of the pulse modulation signal, and thus the frequency and the phase of the pulse modulation signal can be adjusted by setting the modulation counter so that an integer number of saw-tooth waves are contained in one cycle of the back electromotive detection signal.

The pulse adjustment unit may include a free run counter which operates at a cycle same as the modulation counter. The frequency error detector may monitor a count value P[i] of the free run counter at a time the back electromotive detection signal becomes a predetermined level in the $i^{th}$ (i is an arbitrary natural number) time, calculate every time a difference $\Delta P[i]=P[i]-P[i-1]$ with a count value $P[i-1]$ of the free run counter at a time the back electromotive detection signal becomes a predetermined level in the previous $(i-1)^{th}$ time, and output a frequency error $\delta F[i]=\Delta P[i]-\Delta P[i-1]$ indicated by a current difference $\Delta P[i]$ and the previous difference $\Delta P[i-1]=P[i-1]-P[i-2]$ as the frequency error data.

The free run counter repeats count-up or count-down at the same cycle without being set. If the motor rotates at a constant revolution, the time interval (i.e., frequency) that becomes a predetermined level of the back electromotive detection signal is constant. Therefore the difference $\Delta P$ of the count value is constant when the revolution of the motor is constant. Conversely, the difference $\Delta P$ which is monitored changes when the revolution of the motor changes.

According to the embodiment, the fluctuation in the frequency (revolution of motor) of the back electromotive detection signal can be monitored, and the timing of setting the modulation counter is adjusted according to the fluctuation, so that the frequency of the pulse modulation signal is set to integral multiples of the frequency of the back electromotive detection signal.

The motor drive circuit of one embodiment further includes a mask signal generation unit which generates a mask signal that becomes a predetermined level and validates a detection of a zero crossing point by the back electromotive detection circuit during a detection period in an ON period in which the pulse modulation signal is at a level indicating an ON state of at least one of the high-side switch and the low-side switch contained in the switching circuit; and a reference signal generation unit which generates the reference signal that becomes the predetermined level during the detection period the detection of the zero crossing point is validated by the mask signal, and defines the reference timing. The pulse adjustment unit may detect a phase error of the back electromotive detection signal and the reference signal, and generates phase error data corresponding to the phase error.

Another embodiment of the present invention also relates to a motor drive circuit which supplies drive current and drives a multi-phase motor. The motor drive circuit including a plurality of switching circuits provided for respective coils of the multi-phase motor and operative to apply a voltage of high level or low level to one end of the coil; a pulse modulation signal generation unit which generates a pulse modulation signal whose duty ratio changes according to a target torque of the multi-phase motor; a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point; a switching control unit which receives the pulse modulation signal from the pulse modulation signal generation unit and the back electromotive detection signal from the back electromotive detection circuit, and performs sequence control of switching phases to be driven based on the back electromotive detection signal and switch controls at least one of a high side switch and a low side switch contained in the switching circuit to be driven based on the pulse modulation signal; and a pulse adjustment unit which receives the back electromotive detection signal from the back electromotive detection circuit and change the phase of the pulse modulation signal according to the timing the back electromotive detection signal becomes the predetermined level.

According to the embodiment, the feedback is applied so that the timing of zero crossing coincides with the predetermined reference timing. Therefore, the timing of the zero crossing point can be accurately detected with small delay by setting the timing of detecting the zero crossing point near the timing of the reference signal.

The pulse modulation signal generation unit may slice a cycle signal of a predetermined frequency with a value corresponding to the target torque of the multi-phase motor, and generate the pulse modulation signal whose duty ratio changes; and the pulse adjustment unit may change the phase of the cycle signal according to the timing the back electromotive detection signal becomes the predetermined level.

The pulse modulation signal generation unit may include a modulation counter which repeats a count-up or a count-down operation at a predetermined cycle shorter than a cycle of the back electromotive detection signal, and may slice the count value of the modulation counter with the value of the torque signal indicating the target torque. The pulse adjustment unit may include a counter setting unit which sets the modulation counter according to a timing the back electromotive detection signal becomes the predetermined level.

The pulse adjustment unit may include a second counter which is set for every timing the back electromotive detection signal becomes the predetermined level and which starts counting; and an initial value setting unit which monitors the second counter, acquires amount of change in the count value of the second counter from when the back electromotive detection signal becomes the predetermined level until the back electromotive detection signal becomes the predetermined level the next time, and sets the acquired value to an initial value in the next setting of the second counter. The counter setting unit may set the modulation counter every time the count value of the second counter becomes a predetermined value.

The motor drive circuit of one embodiment may be monolithically integrated on one semiconductor substrate. "Monolithically integrate" includes a case of forming all the components of the circuit on the semiconductor substrate and a case of monolithically integrating the main components of the circuit, where some resistors and capacitors for adjustment of circuit constant can be provided exterior to the semiconductor substrate. The circuit area can be reduced by integrating the motor drive circuit as one LSI.

Another embodiment of the present invention relates to a disc apparatus. The apparatus includes a spindle motor which rotates the disc and the motor drive circuit described above which drives the spindle motor.

According to such embodiment, the zero crossing point by the motor drive circuit can be accurately detected, and the spindle motor can be stably rotated.

Another embodiment of the present invention relates to a motor drive method of supplying drive current and driving a multi-phase motor. The method includes generating a pulse modulation signal whose duty ratio changes according to a target torque of the multi-phase motor; detecting a zero crossing point by comparing a back electromotive voltage generated in at least one coil of the multi-phase motor with a middle point voltage of the coil, and generating a back electromotive detection signal that becomes a predetermined level at a timing of the zero crossing point; performing sequence control of switching phases to be driven based on the back electromotive detection signal and switch controlling at least one of a high side switch and a low side switch connected to the coil based on the pulse modulation signal; generating a reference signal that becomes a predetermined level at a predetermined timing in one cycle of the back electromotive detections signal, and adjusting the frequency and the phase of the pulse modulation signal so that a phase error of the back electromotive detection signal and the reference signal becomes a minimum and the frequency of the pulse modulation signal becomes integral multiples of the frequency of the back electromotive detection signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A to 1C are timing charts showing a state of detecting a zero crossing point in pulse modulation drive;

FIGS. 3A to 3L are timing charts showing the operation of the motor drive circuit according to the first embodiment;

FIGS. 5A to 5H are timing charts showing the waveform of each signal generated by the back electromotive detection circuit and the PWM signal generation unit;

FIGS. 10A to 10H are timing charts showing the waveform of each signal generated by the back electromotive detection circuit and the PWM signal generation unit of FIG. 9;

FIGS. 12A to 12G are timing charts showing the waveform of each signal generated by the back electromotive detection circuit and the PWM signal generation unit of FIG. 11.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the specification, a state in which "member A and member B are connected" refers to a case where member A and member B are physically and directly connected and a case where member A and member B are indirectly connected by way of another member that does not influence the electrical connection state.

Similarly, a state in which "member C is provided between member A and member B" refers to a case where member A and member C or member B and member C are directly connected or indirectly connected by way of another member that does not influence the electrical connection state.

First Embodiment

Figure 2:
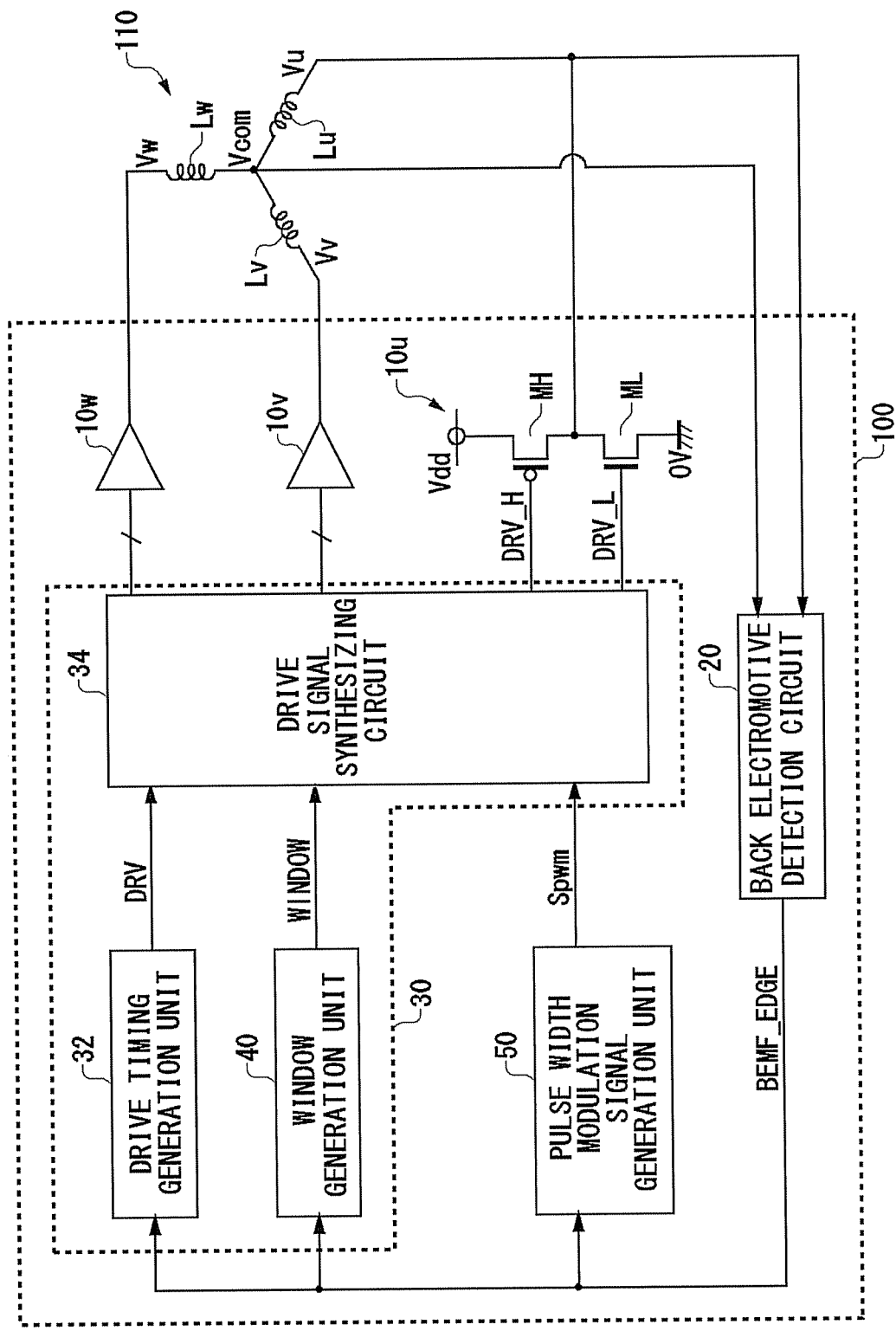
FIG. 2 is a block diagram showing an overall configuration of a motor drive circuit according to a first embodiment.

FIG. 2 is a block diagram showing a configuration of a motor drive circuit 100 according to a first embodiment. The motor drive circuit 100 supplies drive current to a sensorless brushless DC motor (hereinafter simply referred to as "motor 110") and controls the rotation. In the present embodiment, the motor 110 to be driven is a three-phase DC motor including coils Lu, Lv, Lw of U phase, V phase, and W phase.

The motor drive circuit 100 includes switching circuits 10u, 10v, 10w collectively referred to as a switching circuit 10, a back electromotive detection circuit 20, a switching control unit 30, and a pulse width modulation signal generation unit (hereinafter also referred to as PWM signal generation unit) 50. The motor drive circuit 100 is monolithically integrated as a function IC on one semiconductor substrate. For instance, the motor drive circuit 100 PWM drives a multiphase motor 110 to obtain a desired torque. The duty ratio of the PWM drive may be changed so that the current flowing to the coil of each phase becomes an arch form or a sinusoidal form through 180 degrees conduction method.

The switching circuits 10u, 10v, and 10w are provided for respective coil Lu, Lv, and Lw of the motor 110. The switching circuit 10u is configured including a high-side switch and a low-side switch (not shown) connected in series between a power supply voltage and a ground potential, where a node of the two switches is connected to one end of the coil Lu. A drive signal DRV_H (U) and a drive signal DRV_L (U) are input to the control terminal (gate) of the high-side switch and the low-side switch, respectively. The switching circuit 10u applies a voltage (Vdd) of high level to one end of the connected coil Lu when the high-side switch is turned ON and applies a voltage (0V) of low level when the low-side switch is turned ON. The high impedance state is set by simultaneously turning OFF the high-side switch and the low-side switch. This is the same for the V phase and the W phase.

The back electromotive detection circuit 20 compares the back electromotive voltage generated in at least one coil of the motor 110 with the middle point voltage of the coil and detects the zero crossing point, and outputs a back electromotive detection signal BEMF_EDGE that becomes a predetermined level (hereinafter referred to as high level) at a timing of the zero crossing point in which the two voltages cross. In the present embodiment, the back electromotive detection circuit 20 monitors the back electromotive voltage Vu generated at the coil Lu of the U phase and the middle point voltage Vcom, and generates the back electromotive detection signal BEMF_EDGE. The generated back electromotive detection signal BEMF_EDGE is output to a drive timing generation unit 32, a window generation unit 40, and a PWM signal generation unit 50. The details of the back electromotive detection circuit 20 will be hereinafter described.

The PWM signal generation unit 50 generates a pulse width modulation signal (hereinafter referred to as PWM signal Spwm) whose duty ratio changes according to the target torque of at least the motor 110. The PWM signal generation unit 50 compares the level of the cyclic signal Sosc of triangular wave or saw-tooth wave with a signal (hereinafter referred to as torque signal) TRQ instructing torque, and changes the period of high level and low level of the PWM signal Spwm according to the magnitude relation. The PWM signal generation unit 50 may be configured by any of a digital circuit or an analog circuit. The configuration by the digital circuit will be described below by way of example, but may obviously be replaced with the analog circuit having the same function.

The PWM signal generation unit 50 may generate the PWM signal Spwm by synthesizing the target torque and the control waveform of sinusoidal form or arch form to gradually change the coil current flowing to the coils Lu, Lv, and Lw.

The switching control unit 30 receives the PWM signal Spwm from the PWM signal generation unit 50, and the back electromotive detection signal BEMF_EDGE from the back electromotive detection circuit 20. The switching control unit 30 performs a sequence control for switching the phases (U, V, W) to be driven based on the back electromotive detection signal BEMF_EDGE. At least one of the high-side switch MH and the low-side switch ML contained in the switching circuit 10 may be switch controlled based on the PWM signal Spwm.

To realize such function, the switching control unit 30 includes a drive timing generation unit 32, a drive signal synthesizing circuit 34, and the window generation unit 40.

The drive timing generation unit 32 receives the back electromotive detection signal BEMF_EDGE, and generates a drive signal DRV for controlling the sequence of the ON/OFF state of the plurality of switching circuits 10u, 10v, and 10w. For instance, the drive signal DRV is a signal having a cycle of ⅙ of the cycle Tp1 of the back electromotive detection signal BEMF_EDGE. The drive signal DRV may be generated according to methods such as 180 degrees conduction and 120 degrees conduction.

The drive signal synthesizing circuit 34 synthesizes the drive signal DRV and the PWM signal Spwm, and outputs the drive signal DRV_H (U, V, W), and DRV_L (U, V, W) to control the state of the switching circuits 10u, 10v, and 10w. Specifically, the drive signal synthesizing circuit 34 switch controls through the PWM method at least one of the high-side switch MH and the low-side switch ML contained in the plurality of switching circuits 10u, 10v, and 10w based on the PWM signal Spwm.

The window generation unit 40 stops the switching of the switching circuit 10u connected to the coil Lu acting as the target of back electromotive detection and generates a window signal WINDOW for setting to high impedance prior to the detection of the zero crossing point of the back electromotive detection circuit 20. In the present embodiment, the predetermined level is high level. When performing the 120 degrees conduction, the window generation unit 40 can be omitted if a period in which the current does not flow to the coil Lu acting as the target of back electromotive detection exists.

The window signal WINDOW is output to the drive signal synthesizing circuit 34. The drive signal synthesizing circuit 34 stops the switching of the switching circuit 10u connected to the terminal in which the back electromotive voltage Vu to be monitored for detection of the zero crossing point is generated and sets to the high impedance state during the period the window signal WINDOW is at high level. That is, a phase that is not driven intentionally is set to detect the zero crossing point during the period the window signal WINDOW is at high level. In the present embodiment, the U phase is set to the phase that is not driven in the non-driving period Tp3.

The overall operation of the motor drive circuit 100 configured as above will be described. FIGS. 3A to 3L are timing charts showing the operation of the motor drive circuit 100 according to the first embodiment. The vertical axis and the horizontal axis of FIGS. 3A to 3L are appropriately enlarged and reduced to facilitate the understanding, and each waveform shown is also simplified for easy understanding. FIGS. 3A to 3C are waveforms showing the driving state of the coils Lu, Lv, and Lw of the U phase, the V phase, and the W phase by the switching circuits 10u, 10v, and 10w. FIG. 3D shows the back electromotive detection signal BEMF_EDGE detected by the back electromotive detection circuit 20, FIG. 3E shows the drive signal DRV generated by the drive timing generation unit 32, and FIG. 3F shows the window signal WINDOW generated by the window generation unit 40. Furthermore, FIGS. 3G to 3L show the drive signals DRV_H, DRV_L of the high-side switch MH and the low-side switch ML of the switching circuits 10u to 10w.

As shown in FIGS. 3A to 3C, in the present embodiment, the drive current is driven so as to form an arch waveform. The present invention is obviously not limited thereto, and may be a sinusoidal waveform as described above. Furthermore, the drive current may be driven so as to become constant. In the present embodiment, the back electromotive detection signal BEMF_EDGE is generated for every zero crossing point in which the back electromotive voltage Vu crosses the middle point voltage Vcom as shown in FIG. 3D. The drive timing generation unit 32 generates the drive signal DRV shown in FIG. 3E which is ⅙ times the cycle Tp1 of the back electromotive detection signal BEMF_EDGE. As shown in the figure, the drive signal DRV may be given a delay Td with respect to the back electromotive detection signal BEMF_EDGE. The motor drive is optimized by adjusting the delay Td.

The drive signal synthesizing circuit 34 generates the drive signal DRV_H (U, V, W), DRV_L (U, V, W) for controlling ON/OFF of the switching circuits 10u to 10w based on the drive signal DRV generated by the drive timing generation unit 32. This drive sequence is appropriately set according to the conduction angle etc.

Regarding the drive signal DRV_HU shown in FIG. 3G, the high level corresponds to the ON state of the high-side switch of the switching circuit 10u, and the low level corresponds to the OFF state. This is the same for the drive signals DRV_H (V, W), and DRV_L (U, V, W) shown in FIGS. 3F to 3L. The ON state of at least one of the high-side switch or the low-side switch is pulse width modulated to obtain the drive waveform shown in FIGS. 3A to 3C, and the high-side switch or the low-side switch of the switching circuits 10u to 10w alternately repeat ON/OFF at a high frequency based on the PWM signal.

The drive signal synthesizing circuit 34 transitions the ON/OFF state of the drive signal DRV_H, DRV_L of the switching circuits 10u to 10w according to a predetermined drive sequence every time the back electromotive detection signal BEMF_EDGE is output.

The window signal WINDOW shown in FIG. 3F becomes high level by the window generation unit 40 prior to the time the zero crossing point is generated. The drive signal synthesizing circuit 34 set the drive signals DRV_HU, DRV_LU to be output to the switching circuit 10u to low level, turns OFF the high-side switch and the low-side switch, and obtains the high impedance state during the period the window generation unit 40 is at high level. FIGS. 3G and 3J show the period set to the high impedance state for detection of the zero crossing point with diagonal lines. When the window signal WIDNOW is at high level and one end of the coil Lu is set to the high impedance state, detection of the zero crossing point becomes possible, and the back electromotive detection signal BEMF_EDGE is generated.

The outline of the overall configuration and the operation of the motor drive circuit 100 are as described above. The back electromotive detection circuit 20 and the PWM signal generation unit 50 will now be described.

Figure 4:
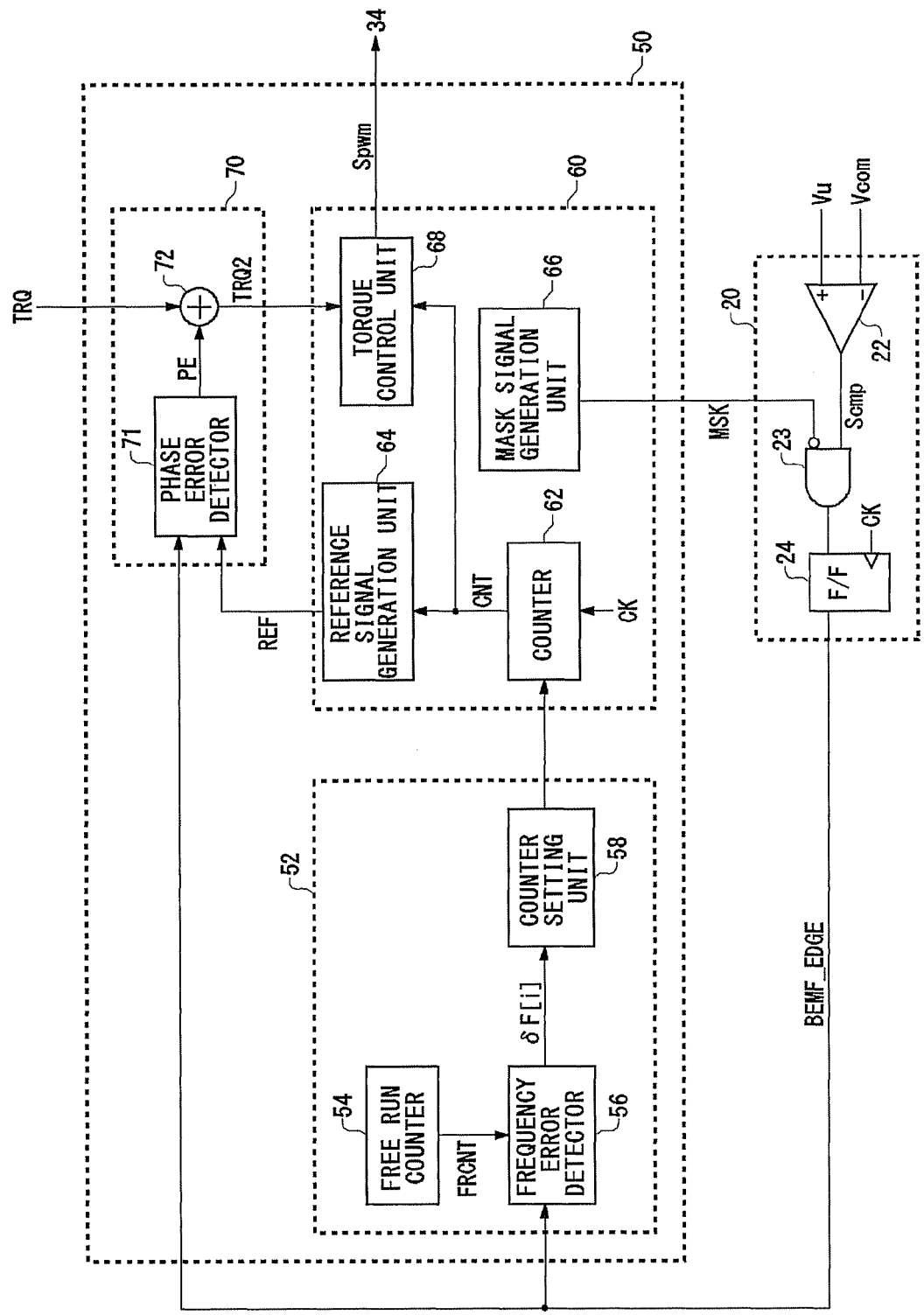
FIG. 4 is a block diagram showing a configuration of a back electromotive detection circuit and a PWM signal generation unit according to the first embodiment.

FIG. 4 is a block diagram showing a configuration of the back electromotive detection circuit 20 and the PWM signal generation unit 50 according to the first embodiment. FIGS. 5A to 5H are timing charts showing the waveform of each signal generated by the back electromotive detection circuit 20 and the PWM signal generation unit 50.

The back electromotive voltage Vu, the middle point voltage Vcom, and a mask signal MSK are input to the back electromotive detection circuit 20 according to the present embodiment. The mask signal MSK is a signal for setting a detection period Tdet that validates the detection of the zero crossing point, where the detection of the zero crossing point is validated only during the period the mask signal MSK is at a predetermined level (low level). The mask signal MSK is generated by a mask signal generation unit 66 to be hereinafter described.

The back electromotive detection circuit 20 includes a comparator 22, an AND gate 23, and a flip-flop 24. The comparator 22 compares the back electromotive voltage Vu with the middle point voltage Vcom, and outputs a comparison signal Scmp corresponding to the magnitude relation. The AND gate 23 outputs a logical product of the comparison signal Scmp and the logical inversion (*MSK) of the mask signal MSK. The flip-flop 24 latches the output of the AND gate 23 based on the system clock CK. According to the back electromotive detection circuit 20 configured as above, when Vu>Vcom during the detection period Tdet the mask signal MSK becomes low level, the back electromotive detection signal BEMF_EDGE becomes high level, and the zero crossing point is detected.

The zero crossing point is not detected even if Vu>Vcom other than during the detection period Tdet since mask is applied.

The signal TRQ instructing torque is input to the PWM signal generation unit 50. The PWM signal generation unit 50 generates the PWM signal Spwm whose pulse width (duty ratio) changes according to the torque signal TRQ. The back electromotive detection signal BEMF_EDGE generated by the back electromotive detection circuit 20 is input to the PWM signal generation unit 50.

The PWM signal generation unit 50 adjusts the duty ratio and the phase of the PWM signal Spwm through feedback with the frequency and the phase of the back electromotive detection signal BEMF_EDGE as feedback amount. This feedback will be described below.

The PWM signal generation unit 50 includes a frequency adjustment unit 52, a pulse generation unit 60, and a phase adjustment unit 70. Each block has the following function.

The pulse generation unit 60 generates three signals of PWM signal Spwm, the mask signal MSK, and the reference signal REF. The pulse generation unit 60 includes a counter 62, a reference signal generation unit 64, the mask signal generation unit 66, and a torque control unit 68. The torque control unit 68 generates the PWM signal Spwm having a duty ratio corresponding to the externally input torque signal TRQ. The system clock CK is input to the counter 62, and when set at a certain timing, starts to count up (or count down), and repeats the same for a predetermined frequency (cycle). A count value CNT generated in this manner becomes a saw-tooth wave. The torque control unit 68 compares the count value by the counter 62 with a value of a target torque signal TRQ2, and generates the PWM signal Spwm that is high level when TRQ2>CNT and low level when TRQ2<CNT. The power supply voltage or the ground voltage is applied to one end of each coil Lu to Lw by the switching circuit 10 during the period the PWM signal Spwm is at high level. The period the PWM signal Spwm is at high level is hereinafter referred to as ON period Ton.

The reference signal generation unit 64 generates a reference signal REF that becomes a predetermined level (high level) for every predetermined timing. The reference signal REF defines the timing at which the phase of the back electromotive detection signal BEMF_EDGE is to coincide.

The mask signal generation unit 66 generates the mask signal MSK. As described above, the mask signal MSK is a signal for setting the detection period Tdet of the zero crossing point, and becomes low level during the detection period Tdet in the ON period Ton of the PWM signal Spwm. The mask signal generation unit 66 may include a counter (not shown) that starts counting with transition of the PWM signal Spwm to high level as the trigger to generate the mask signal MSK. In this case, the mask signal MSK is low level when the count value becomes a first predetermined value, and thereafter, the mask signal MSK becomes high level when the count value becomes a second predetermined value.

The phase adjustment unit 70 receives the back electromotive detection signal BEMF_EDGE from the back electromotive detection circuit 20 and the reference signal REF generated by the reference signal generation unit 64. The phase adjustment unit 70 compares the phases of the two signals and adjusts the duty ratio of the PWM signal Spwm by feedback so that the phase error becomes a minimum.

To realize such function, the phase adjustment unit 70 includes a phase error detector 71 and a torque adjustment unit 72. The phase error detector 71 detects the phase error $\Delta\phi$ of the reference signal REF and the back electromotive detection signal BEMF_EDGE, and outputs a phase error signal PE indicating the phase error $\Delta\phi$. The phase error signal PE may be a value obtained by counting the time of the phase error $\Delta\phi$ with the system clock CK.

The torque adjustment unit 72 receives the phase error signal PE output from the phase error detector 71 and the externally input torque signal TRQ. The torque adjustment unit 72 reflects the phase error $\Delta\phi$ indicated by the phase error signal PE on the target torque signal TRQ2. For instance, the torque adjustment unit 72 lowers the target torque signal TRQ2 to increase the torque when the phase of the back electromotive detection signal BEMF_EDGE is delayed with respect to the reference signal REF. On the other hand, the torque adjustment unit 72 increases the target torque signal TRQ2 to lower the torque when the phase of the back electromotive detection signal BEMF_EDGE is advanced with respect to the reference signal REF. As a result of such feedback, the phase of the back electromotive detection signal BEMF_EDGE approaches the phase of the reference signal REF.

The torque adjustment unit 72 may be configured so that the loop gain and the parameter corresponding to the band of the loop filter are adjustable to reflect the phase error signal PE to the target torque signal TRQ2. For instance, when adding the torque signal TRQ by multiplying a coefficient to the phase error signal PE, the torque adjustment unit 72 desirably has the coefficient adjustable. The coefficient corresponds to the loop gain.

When delaying the phase error signal PE by a delay time and adding the torque signal TRQ by a predetermined time, the delay time and the predetermined time are desirably adjustable. Such times correspond to the band of the loop filter.

The frequency adjustment unit 52 adjusts the frequency of the PWM signal Spwm so that the frequency of the PWM signal Spwm becomes integral multiples of the frequency of the back electromotive detection signal BEMF_EDGE.

The frequency adjustment unit 52 has a function of detecting the revolution of the motor 110, that is, the frequency of the back electromotive detection signal BEMF_EDGE. The frequency adjustment unit 52 includes a free run counter 54, a frequency error detector 56, and a counter setting unit 58. The detection of the frequency of the back electromotive detection signal BEMF_EDGE is executed by the free run counter 54 and the frequency error detector 56.

The free run counter 54 receives the system clock CK, and operates at the same cycle as the counter 62. The free run counter 54 repeats count-up or count-down at the same cycle without being set, as opposed to the counter 62.

The frequency error detector 56 receives the back electromotive detection signal BEMF_EDGE and the count value FRCNT of the free run counter 54. The frequency error detector 56 monitors the count value of the free run counter 54 at the time the back electromotive detection signal BEMF_EDGE becomes high level every time. The $i^{th}$ (i is an arbitrary natural number) count value is written as P[i].

The frequency error detector 56 calculates, every time, a difference between the count value P[i] for this time and the count value P[i−1] of the free run counter 54 at the time the back electromotive detection signal becomes a predetermined level at the previous $(i-1)^{th}$ time as:

$$\Delta P[i]=P[i]-P[i-1]$$

The difference $\Delta P$ of the count value P[i] is data indicating the fluctuation in cycle time, that is, fluctuation in frequency of the back electromotive detection signal BEMF_EDGE.

The frequency error detector 56 calculates the difference between the difference $\Delta P[i]$ for this time and the difference $\Delta P[i-1]=P[i-1]-P[i-2]$ of the previous time $$\delta F[i]=\Delta P[i]-\Delta P[i-1]$$

$\delta F[i]$ is data indicating the error of the frequency of the back electromotive detection signal BEMF_EDGE, that is, error of the cycle time. $\delta F[i]$ is hereinafter referred to as frequency error data. The counter setting unit 58 receives the frequency error data $\delta F[i]$ and sets the counter 62 according to the value thereof.

When the motor 110 rotates at a constant revolution, the time interval the back electromotive detection signal BEMF_EDGE becomes high level is constant. Therefore, when the revolution of the motor 110 is constant, the count value P[i] increases (or decreases) at a predetermined width for every rotation, and $\delta F[i]=\Delta P[i]-\Delta P[i-1]$ becomes a constant value. $\delta F[i]$ increases (or decreases) if the revolution of the motor 110 rises, and $\delta F[i]$ decreases (or increases) if the revolution of the motor lowers.

For instance, suppose the count values for four continuous times are P[i−2]=8, P[i−1]=12, P[i]=16, P[i+1]=18, P[i+2]= 22. At this time, each difference is, $$\Delta P[i-1]=4$$

$$\Delta P[i]=4$$

$\Delta P[i+1]=2$ $\Delta P[i+2]=4$; and $\delta F[i]=0$ $\delta F[i+1]=-2$ $\delta F[i+2]=2$.

The counter setting unit 58 sets the counter 62 at the timing same as the previous time when $\delta F[i]$ is zero, delays the timing of setting than the previous time when $\delta F[i]$ is negative, and advances the timing of setting than the previous time when $\delta F[i]$ is positive.

More specifically, the counter setting unit 58 sets the timing same as the previous time when $\delta F[i]=0$. When $\delta F[i+1]=-2$, the counter setting unit 58 advances the timing of setting by two clocks of the system clock CK from the timing of setting of the previous time. When $\delta F[i+1]=2$, the counter setting unit 58 delays the timing of setting for two clocks from the timing of setting of the previous time.

The operation of the motor drive circuit 100 will be described in detail with reference to FIGS. 5A to 5H. The vertical axis and the horizontal axis of the figure, and each waveform are shown in a simplified manner for easy understanding, and the frequency and the amplitude are different from the actual waveform.

At before time t0 is the non-detection period, and the power supply voltage Vdd and the ground voltage are alternately applied to the coil of U phase. At time t0, the detection of the zero crossing point is instructed by the window generation unit 40, and the coil Lu of U phase is set to high impedance. In the timing chart of the figure, time t0 and time t2 are the timing of setting of the counter 62, and the zone t0 to t2 are corresponded to one cycle of the back electromotive detection signal BEMF_EDGE.

FIGS. 5A and 5B will be referenced. The count value CNT of the counter 62 becomes a saw-tooth wave of cycle Tx. The torque control unit 68 compares the count value CNT with the value of the target torque signal TRQ2, and generates the PWM signal Spwm that becomes high level when TRQ2>CNT and low level when TRQ2<CNT. The duty ratio (Ton/Tx) of the PWM signal Spwm becomes larger the lower the target torque signal TRQ2, and the motor 110 is driven at high torque.

As shown in FIG. 5C, the mask signal MSK generated by the mask signal generation unit 66 becomes low level during the detection period Tdet in the ON time Ton of the PWM signal Spwm. As shown in FIG. 5D, the reference signal REF becomes high level after a predetermined time $\tau$ has elapsed after the counter 62 is set and count-up is started. FIGS. 5E to 5G show generation of the back electromotive detection signal BEMD_EDGE by the phase adjustment unit 70. The back electromotive detection signal BEMF_EDGE becomes high level at time t1 and time t3.

The phase error detector 71 detects the phase error $\Delta \phi$ of the back electromotive detection signal BEMF_EDGE and the reference signal REF, and generates a phase error signal PE corresponding to the phase error $\Delta \phi$. The torque adjustment unit 72 synthesizes the feedback amount corresponding to the phase error signal PE with the external torque signal TRQ, and generates a target torque signal TRQ2. As shown in FIGS. 5D and 5G, feedback is applied such that the target torque signal TRQ2 become lower, that is, the torque becomes larger when the back electromotive detection signal BEMF_EDGE is delayed.

When the torque is large, the back electromotive voltage Vu rises faster than the previous time in detecting the zero crossing point in the next cycle. As a result, the zero crossing point is generated temporally faster, and the timing of the back electromotive detection signal BEFM_EDGE approaches the timing of the reference signal REF.

That is, the torque of the motor 110 is controlled so that the timing of the zero crossing point, that is, the phase error $\Delta \phi$ of the back electromotive detection signal BEMF_EDGE and the reference signal REF approaches zero by the phase adjustment unit 70.

FIG. 5H shows the count value FRCNT of the free run counter 54. The count value at time t1, t3 at which the back electromotive detection signal BEMF_EDGE becomes high level is indicated as P[i-1], P[i]. The frequency error detector 56 monitors the count value P[i] for every cycle, and calculates the difference $\Delta P[i]$ with the previous count value P[i-1]. The frequency error detector 56 calculates the frequency error $\delta F[i]$ of the calculated difference $\Delta P[i]$ and the previous difference $\Delta P[i-1]$. The counter setting unit 58 changes the timing of setting the counter 62 in the next cycle according to the frequency error $\delta F[i]$.

An integer number of saw-tooth waves are contained at the cycle of time t0 to t2 by the process of the frequency adjustment unit 52. The cycle of the saw-tooth wave immediately before time t2 is smaller than Tx, but is still one saw-tooth wave. In other words, a state in which the frequency of the PWM signal Spwm is an integer multiples of the frequency of the back electromotive detection signal BEMF_EDGE is realized by creating a state in which the saw-tooth wave that increases over the cycle does not exist.

The configuration and the operation of the motor drive circuit 100 according to the first embodiment has been described. According to the motor drive circuit 100 of the present embodiment, the timing at which the back electromotive detection signal BEMF_EDGE becomes high level, that is, the timing at which the zero crossing point is generated can be coincided with a predetermined reference timing. Therefore, the back electromotive detection can be reliably performed with small delay by providing a detection timing (detection period Tdet in the first embodiment) in the time zone including the reference timing. The rotation of the motor 110 can be controlled with high accuracy by performing the back electromotive detection at high accuracy.

From another standpoint, the motor drive circuit 100 according to the present embodiment drives the motor so that the zero crossing point is generated at the timing of performing the detection instead of performing the back electromotive detection according to the timing at which the zero crossing point is generated. As a result, the zero crossing point is prevented from being generated at an unintended timing, and the detection from being delayed, whereby an accurate detection can be realized.

Figure 6:
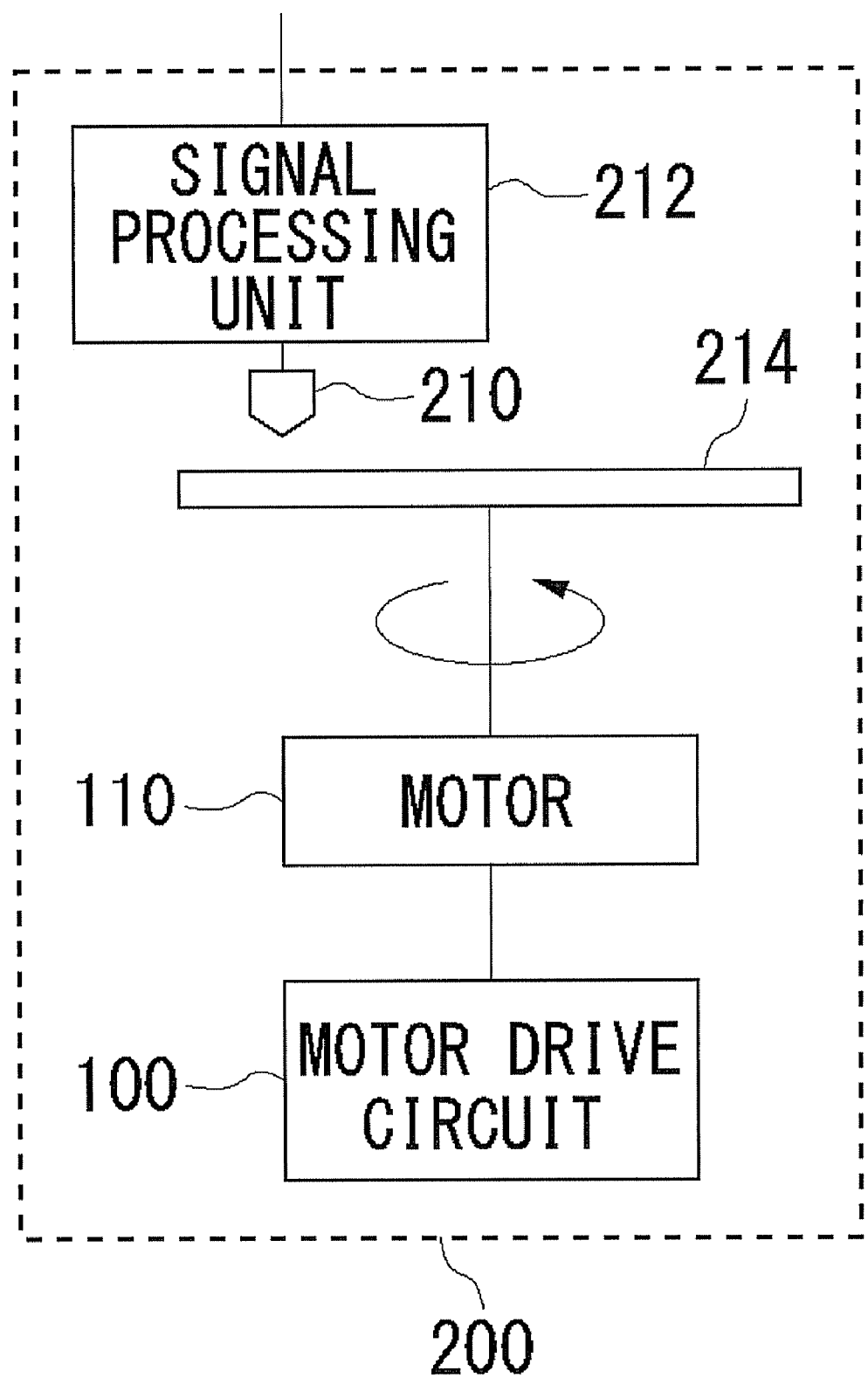
FIG. 6 is a block diagram showing a configuration of a disc apparatus mounted with the motor drive circuit of FIG. 2.

Lastly, an example of an application of the motor drive circuit 100 according to the present embodiment will be described. FIG. 6 is a block diagram showing a configuration of a disc apparatus 200 mounted with the motor drive circuit 100 of FIG. 2. The disc apparatus 200 is a unit for performing recording and reproducing process on an optical disc such as CD and DVD, and is mounted on a CD player and a DVD player, and an electronic equipment such as personal computer. The disc apparatus 200 includes a pickup 210, a signal processing unit 212, a disc 214, a motor 110, and a motor drive circuit 100.

The pickup 210 writes the desired data by irradiating laser onto the disc 214, or reads the data written on the disc 214 by reading the reflected light. The signal processing unit 212 performs necessary signal processing such as amplification process, A/D conversion, or D/A conversion on the data read/written through the pickup 210. The motor 110 is a spindle motor provided to rotate the disc 214. Miniaturization is particularly demanded on the disc apparatus 200 shown in FIG. 6, and thus a sensorless type that does not use Hall element etc. is used for the motor 110. The motor drive circuit 100 according to the present embodiment is suitably used to stably drive the sensorless spindle motor.

The present invention has been described based on the embodiment. This embodiment is illustrative, and it should be recognized by those skilled in the art that various modifications may be considered for the combination of each component and each processing process, and that such modifications are encompassed within the scope of the present invention.

In the embodiment, a case of driving a three phase motor has been described, but the present invention can be suitably used in driving a sensorless motor other than of three phases. The motor may be a five phase motor. In the embodiment, a case of detecting the zero crossing point by comparing the back electromotive voltage Vu of the U phase with the middle point voltage Vcom has been described, but the present invention is not limited thereto. The back electromotive detection circuit 20 may be provided for each of the U phase, the V phase, and the W phase to generate the back electromotive detection signal BEMF_EDGE.

When the revolution (torque) of the motor 110 in a stationary state is fixed, the revolution of the motor does not need to be monitored, and thus the free run counter 54 and the frequency error detector 56 can be omitted. In this case, the counter setting unit 58 may set the timing of setting the counter 62 based on the value of the torque signal TRQ instructing the revolution of the motor 110.

In the embodiment, the zero crossing point is detected by detecting a state of Vu>Vcom in the process of rise of the phase voltage Vu, but the present invention is not limited thereto, and the back electromotive detection circuit 20 can detect the zero crossing point by detecting a state of Vu<Vcom in the process of lowering of the phase voltage Vu.

In the embodiment, the detection timing of the zero crossing point is set by coinciding the detection period Tdet defined by the mask signal MSK with the timing of the reference signal REF, but the present invention is not limited thereto. For instance, the mask signal MSK may not be generated and the AND gate 23 of FIG. 4 may be omitted. In this case, the system clock CK to be input to the clock terminal of the flip-flop 24 of FIG. 4 may be input to the flip-flop 24 only around the reference signal REF.

In the embodiment, a case of driving the motor through the PWM method of 180 degrees conduction has been described, but the present invention is not limited thereto, and may be used in a motor drive circuit widely adopting the pulse modulation method.

The setting of logic of high level and low level of the signal described in the embodiment is an example, and various variants can be considered for the configuration of the logic circuit block, which variants are also encompassed in the scope of the present invention.

In the embodiment, a case of realizing the present invention with the digital circuit has been described, but the digital circuit may be partially or entirely replaced with the analog circuit having the same function.

Second Embodiment

Figure 7:
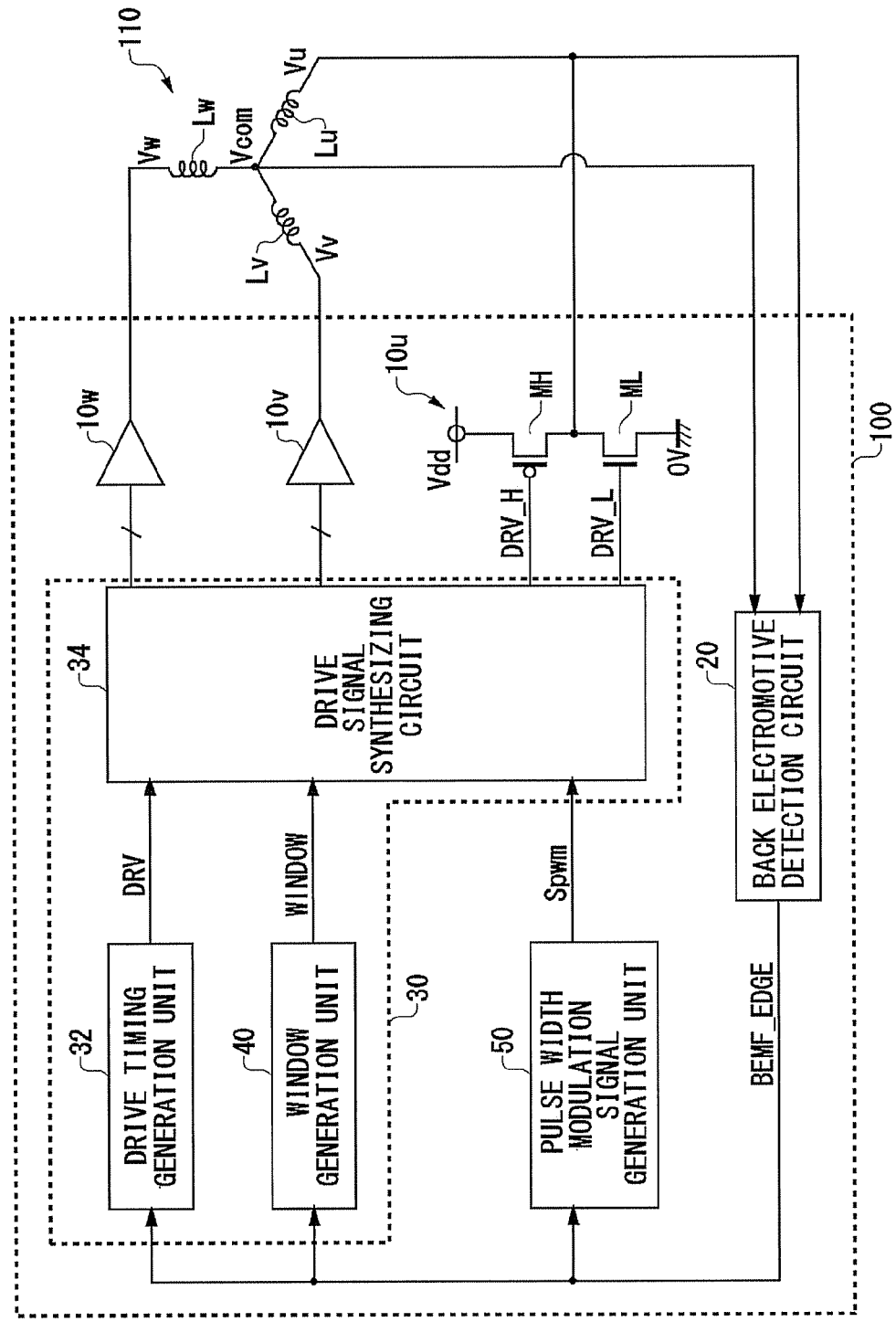
FIG. 7 is a block diagram showing an overall configuration of a motor drive circuit according to a second embodiment.

FIG. 7 is a block diagram showing a configuration of a motor drive circuit 100 according to the embodiment. The motor drive circuit 100 supplies drive current to a sensorless brushless DC motor (hereinafter simply referred to as "motor 110") and controls the rotation. In the present embodiment, the motor 110 to be driven is a three-phase DC motor including coils Lu, Lv, Lw of U phase, V phase, and W phase.

The motor drive circuit 100 includes switching circuits 10u, 10v, 10w collectively referred to as a switching circuit 10, a back electromotive detection circuit 20, a switching control unit 30, and a pulse width modulation signal generation unit (hereinafter also referred to as PWM signal generation unit) 50. The motor drive circuit 100 is monolithically integrated as a function IC on one semiconductor substrate. For instance, the motor drive circuit 100 PWM drives a multi-phase motor 110 to obtain a desired torque. The duty ratio of the PWM drive may be changed so that the current flowing to the coil of each phase becomes an arch form or a sinusoidal form through 180 degrees conduction method.

The switching circuits 10u, 10v, and 10w are provided for every coil Lu, Lv, and Lw of the motor 110. The switching circuit 10u is configured including a high-side switch and a low-side switch (not shown) connected in series between a power supply voltage and a ground potential, where a node of the two switches is connected to one end of the coil Lu. A drive signal DRV_H (U) and a drive signal DRV_L (U) are input to the control terminal (gate) of the high-side switch and the low-side switch, respectively. The switching circuit 10u applies a voltage (Vdd) of high level to one end of the connected coil Lu when the high-side switch is turned ON and applies a voltage (0V) of low level when the low-side switch is turned ON. The high impedance state is set by simultaneously turning OFF the high-side switch and the low-side switch. This is the same for the V phase and the W phase.

The back electromotive detection circuit 20 compares the back electromotive voltage generated in at least one coil of the motor 110 with the middle point voltage of the coil and detects the zero crossing point, and outputs a back electromotive detection signal BEMF_EDGE that becomes a predetermined level (hereinafter referred to as high level) at a timing of the zero crossing point in which the two voltages cross. In the present embodiment, the back electromotive detection circuit 20 monitors the back electromotive voltage Vu generated at the coil Lu of the U phase and the middle point voltage Vcom, and generates the back electromotive detection signal BEMF_EDGE. The generated back electromotive detection signal BEMF_EDGE is output to a drive timing generation unit 32, a window generation unit 40, and a PWM signal generation unit 50. The details of the back electromotive detection circuit 20 will be hereinafter described.

The PWM signal generation unit 50 generates a pulse width modulation signal (hereinafter referred to as PWM signal Spwm) whose duty ratio changes according to the target torque of at least the motor 110. The PWM signal generation unit 50 compares the level of the cyclic signal Sosc of triangular wave or saw-tooth wave and a signal TRQ instructing torque (hereinafter referred to as torque signal), and changes the period of high level and low level of the PWM signal Spwm according to the magnitude relation.

The PWM signal generation unit 50 may be configured by any of a digital circuit or an analog circuit. The configuration by the digital circuit will be described below by way of example, but may obviously be replaced with the analog circuit having the same function.

The PWM signal generation unit 50 may generate the PWM signal Spwm by synthesizing the target torque and the control waveform of sinusoidal form or arch form to gradually change the coil current flowing to the coils Lu, Lv, and Lw.

The switching control unit 30 receives the PWM signal Spwm from the PWM signal generation unit 50, and the back electromotive detection signal BEMF_EDGE from the back electromotive detection circuit 20. The switching control unit 30 performs a sequence control for switching the phases (U, V, W) to be driven based on the back electromotive detection signal BEMF_EDGE. At least one of the high-side switch MH and the low-side switch ML contained in the switching circuit 10 may be switch controlled based on the PWM signal Spwm.

To realize such function, the switching control unit 30 includes a drive timing generation unit 32, a drive signal synthesizing circuit 34, and the window generation unit 40.

The drive timing generation unit 32 receives the back electromotive detection signal BEMF_EDGE, and generates a drive signal DRV for controlling the sequence of the ON/OFF state of the plurality of switching circuits 10*u*, 10*v*, and 10*w*. For instance, the drive signal DRV is a signal having a cycle of ⅙ of the cycle Tp1 of the back electromotive detection signal BEMF_EDGE. The drive signal DRV may be generated according to methods such as 180 degrees conduction and 120 degrees conduction.

The drive signal synthesizing circuit 34 synthesizes the drive signal DRV and the PWM signal Spwm, and outputs the drive signal DRV_H (U, V, W), and DRV_L (U, V, W) to control the state of the switching circuits 10*u*, 10*v*, and 10*w*. Specifically, the drive signal synthesizing circuit 34 switch controls through the PWM method at least one of the high-side switch MH and the low-side switch ML contained in the plurality of switching circuits 10*u*, 10*v*, and 10*w* based on the PWM signal Spwm.

The window generation unit 40 stops the switching of the switching circuit 10*u* connected to the coil Lu acting as the target of back electromotive detection and generates a window signal WINDOW for setting to high impedance prior to the detection of the zero crossing point of the back electromotive detection circuit 20. In the present embodiment, the predetermined level is high level. When performing the 120 degrees conduction, the window generation unit 40 can be omitted if a period in which the current does not flow to the coil Lu acting as the target of back electromotive detection exists.

The window signal WINDOW is output to the drive signal synthesizing circuit 34. The drive signal synthesizing circuit 34 stops the switching of the switching circuit 10*u* connected to the terminal in which the back electromotive voltage Vu to be monitored for detection of the zero crossing point is generated and sets to the high impedance state during the period the window signal WINDOW is at high level. That is, a phase that is not driven intentionally is set to detect the zero crossing point during the period the window signal WINDOW is at high level. In the present embodiment, the U phase is set to the phase that is not driven in the non-driving period Tp3.

Figure 8:
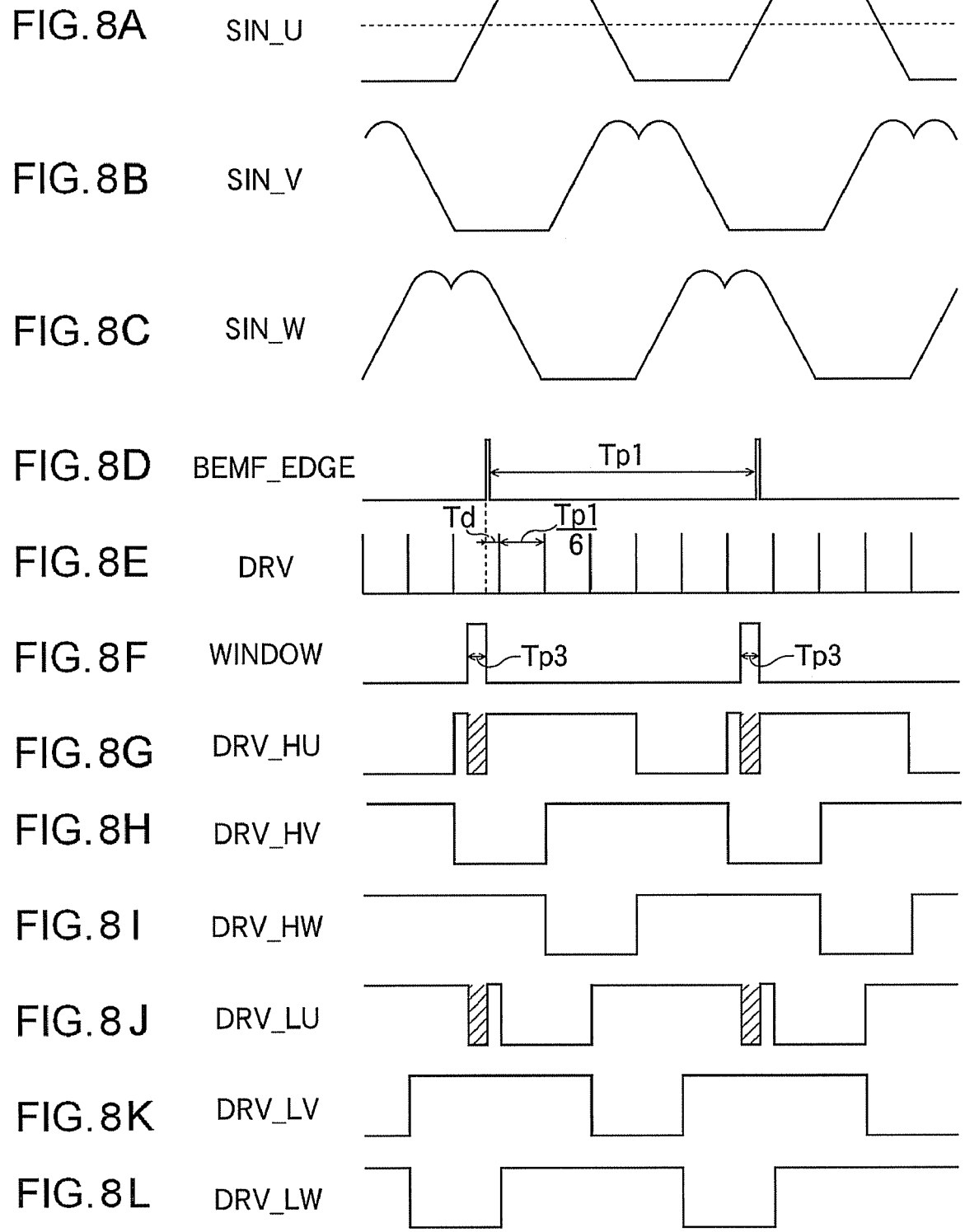
FIGS. 8A to 8L are timing charts showing the operation of the motor drive circuit according to FIG. 7.

The overall operation of the motor drive circuit 100 configured as above will be described. FIGS. 8A to 8L are timing charts showing the operation of the motor drive circuit 100 of FIG. 7. The vertical axis and the horizontal axis of FIGS. 8A to 8L are appropriately enlarged and reduced to facilitate the understanding, and each waveform shown is also simplified for easy understanding. FIGS. 8A to 8C are waveforms showing the driving state of the coils Lu, Lv, and Lw of the U phase, the V phase, and the W phase by the switching circuits 10*u*, 10*v*, and 10*w*. FIG. 8D shows the back electromotive detection signal BEMF_EDGE detected by the back electromotive detection circuit 20, FIG. 8E shows the drive signal DRV generated by the drive timing generation unit 32, and FIG. 8F shows the window signal WINDOW generated by the window generation unit 40. Furthermore, FIGS. 8G to 8L show the drive signals DRV_H, DRV_L of the high-side switch MH and the low-side switch ML of the switching circuits 10*u* to 10*w*.

As shown in FIGS. 8A to 8C, in the present embodiment, the drive current is driven so as to form an arch waveform. The present invention is obviously not limited thereto, and may be a sinusoidal waveform as described above. Furthermore, the drive current may be driven so as to become constant. In the present embodiment, the back electromotive detection signal BEMF_EDGE is generated for every zero crossing point in which the back electromotive voltage Vu crosses the middle point voltage Vcom as shown in FIG. 8D. The drive timing generation unit 32 generates the drive signal DRV shown in FIG. 8E which is ⅙ times the cycle Tp1 of the back electromotive detection signal BEMF_EDGE. As shown in the figure, the drive signal DRV may be given a delay Td with respect to the back electromotive detection signal BEMF_EDGE. The motor drive is optimized by adjusting the delay Td.

The drive signal synthesizing circuit 34 generates the drive signal DRV_H (U, V, W), DRV_L (U, V, W) for controlling ON/OFF of the switching circuits 10*u* to 10*w* based on the drive signal DRV generated by the drive timing generation unit 32. This drive sequence is appropriately set according to the conduction angle etc.

Regarding the drive signal DRV_HU shown in FIG. 8G, the high level corresponds to the ON state of the high-side switch of the switching circuit 10*u*, and the low level corresponds to the OFF state. This is the same for the drive signals DRV_H (V, W), and DRV_L (U, V, W) shown in FIGS. 8H to 8L. The ON state of at least one of the high-side switch or the low-side switch is pulse width modulated to obtain the drive waveform shown in FIGS. 8A to 8C, and the high-side switch or the low-side switch of the switching circuits 10*u* to 10*w* alternately repeat ON/OFF at a high frequency based on the PWM signal.

The drive signal synthesizing circuit 34 transitions the ON/OFF state of the drive signal DRV_H, DRV_L of the switching circuits 10*u* to 10*w* according to a predetermined drive sequence every time the back electromotive detection signal BEMF_EDGE is output.

The window signal WINDOW shown in FIG. 8F becomes high level by the window generation unit 40 prior to the time the zero crossing point is generated. The drive signal synthesizing circuit 34 set the drive signals DRV_HU, DRV_LU to be output to the switching circuit 10*u* to low level, turns OFF the high-side switch and the low-side switch, and obtains the high impedance state during the period the window generation unit 40 is at high level. FIGS. 8G and 8J show the period set to the high impedance state for detection of the zero crossing point with diagonal lines. When the window signal WIDNOW is at high level and one end of the coil Lu is set to the high impedance state, detection of the zero crossing point becomes possible, and the back electromotive detection signal BEMF_EDGE is generated.

The outline of the overall configuration and the operation of the motor drive circuit 100 are as described above. The back electromotive detection circuit 20 and the PWM signal generation unit 50 will now be described.

Figure 9:
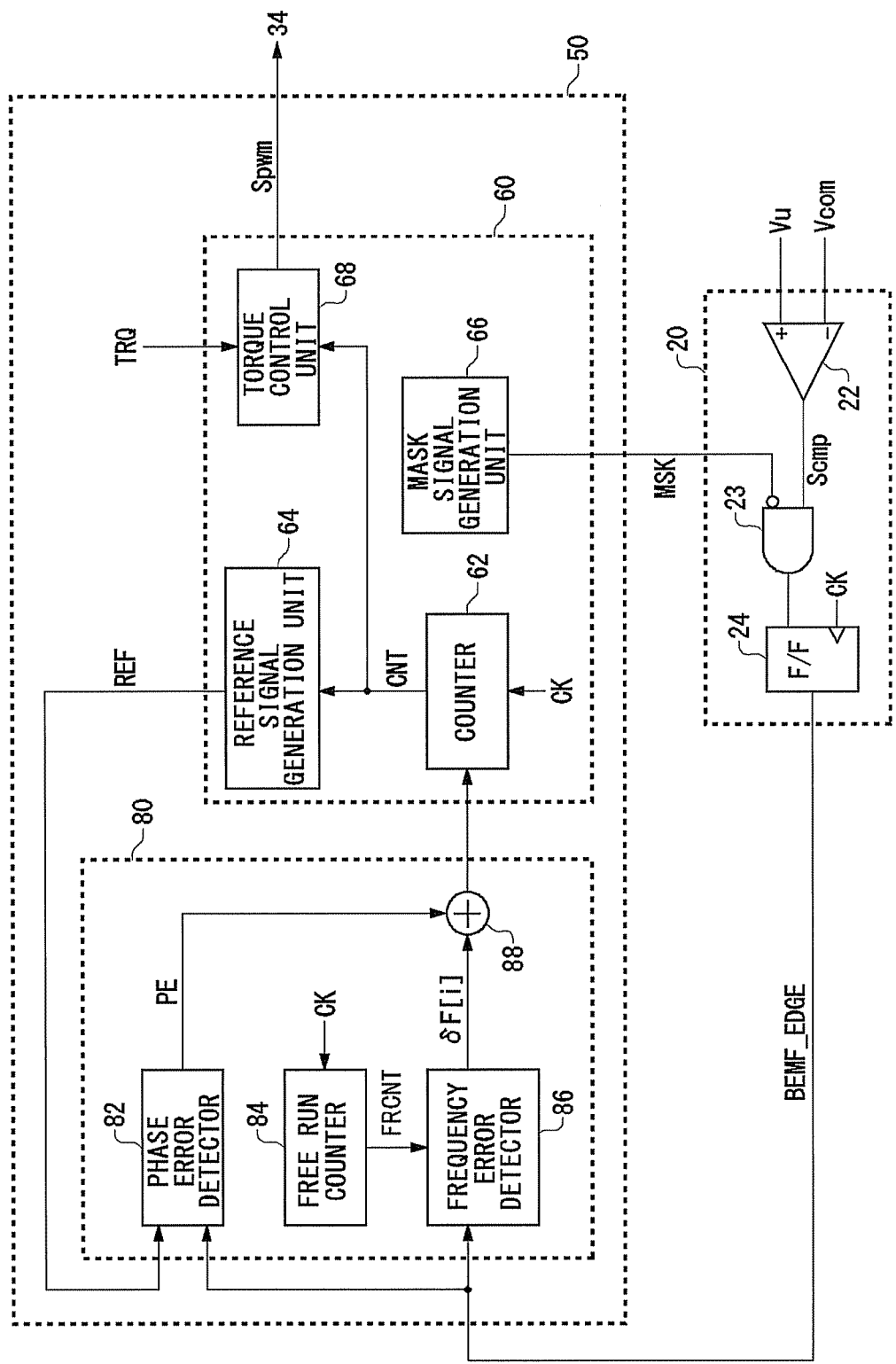
FIG. 9 is a block diagram showing a configuration of a back electromotive detection circuit and a PWM signal generation unit according to a second embodiment.

FIG. 9 is a block diagram showing a configuration of the back electromotive detection circuit 20 and the PWM signal generation unit 50 of FIG. 7 according to the second embodiment. FIGS. 10A to 10H are timing charts showing the waveform of each signal generated by the back electromotive detection circuit 20 and the PWM signal generation unit 50 of FIG. 9.

The back electromotive voltage Vu, the middle point voltage Vcom, and a mask signal MSK are input to the back electromotive detection circuit 20 according to the present embodiment. The mask signal MSK is a signal for setting a detection period Tdet that validates the detection of the zero crossing point, where the detection of the zero crossing point is validated only during the period the mask signal MSK is at a predetermined level (low level). The mask signal MSK is generated by the mask signal generation unit 66 to be hereinafter described.

The back electromotive detection circuit 20 includes a comparator 22, an AND gate 23, and a flip-flop 24. The comparator 22 compares the back electromotive voltage Vu with the middle point voltage Vcom, and outputs a comparison signal Scmp corresponding to the magnitude relation. The AND gate 23 outputs a logical product of the comparison signal Scmp and the logical inversion (*MSK) of the mask signal MSK. The flip-flop 24 latches the output of the AND gate 23 based on the system clock CK. According to the back electromotive detection circuit 20 configured as above, when Vu>Vcom during the detection period Tdet the mask signal MSK becomes low level, the back electromotive detection signal BEMF_EDGE becomes high level, and the zero crossing point is detected. The zero crossing point is not detected even if Vu>Vcom other than during the detection period Tdet since mask is applied.

The signal TRQ instructing torque is input to the PWM signal generation unit 50. The PWM signal generation unit 50 generates the PWM signal Spwm whose pulse width (duty ratio) changes according to the torque signal TRQ. The back electromotive detection signal BEMF_EDGE generated by the back electromotive detection circuit 20 is input to the PWM signal generation unit 50.

The PWM signal generation unit 50 adjusts the duty ratio and the phase of the PWM signal Spwm through feedback at a timing the back electromotive detection signal BEMF_EDGE becomes high level, that is, with the frequency (cycle) as the feedback amount. This feedback will be described below.

The PWM signal generation unit 50 includes a pulse generation unit 60, and a pulse adjustment unit 80. Each block has the following function.

The pulse generation unit 60 generates three signals of PWM signal Spwm, the mask signal MSK, and the reference signal REF. The pulse generation unit 60 includes a modulation counter 62, a reference signal generation unit 64, the mask signal generation unit 66, and the torque control unit 68.

The torque control unit 68 generates the PWM signal Spwm having a duty ratio corresponding to the externally input torque signal TRQ. The system clock CK is input to the modulation counter 62, and when set at a certain timing, starts to count up (or count down), and repeats the same for a predetermined frequency (cycle). A count value CNT generated in this manner becomes a saw-tooth wave. The torque control unit 68 compares the count value by the modulation counter 62 with a value of a target torque signal TRQ, and generates the PWM signal Spwm that is high level when TRQ>CNT and low level when TRQ<CNT. The power supply voltage or the ground voltage is applied to one end of each coil Lu to Lw by the switching circuit 10 during the period the PWM signal Spwm is at high level. The period the PWM signal Spwm is at high level is hereinafter referred to as ON period Ton.

The reference signal generation unit 64 generates a reference signal REF that becomes a predetermined level (high level) for every predetermined timing. The reference signal REF defines the timing at which the phase of the back electromotive detection signal BEMF_EDGE is to coincide.

The mask signal generation unit 66 generates the mask signal MSK. As described above, the mask signal MSK is a signal for setting the detection period Tdet of the zero crossing point, and becomes low level during the detection period Tdet in the ON period Ton of the PWM signal Spwm. The mask signal generation unit 66 may include a counter (not shown) that starts counting with transition of the PWM signal Spwm to high level as the trigger to generate the mask signal MSK. In this case, the mask signal MSK is low level when the count value becomes a first predetermined value, and thereafter, the mask signal MSK becomes high level when the count value becomes a second predetermined value.

The pulse adjustment unit 80 receives the back electromotive detection signal BEMF_EDGE from the back electromotive detection circuit 20 and the reference signal REF that becomes a predetermined level at a predetermined timing. The pulse adjustment unit 80 compares the phases of the two signals and adjusts the frequency and the phase of the PWM signal Spwm so that the phase error $\Delta\phi$ of the two signals becomes a minimum and the frequency of the PWM signal Spwm becomes integral multiplies of the frequency of the back electromotive detection signal BEMF_EDGE.

To realize such function, the pulse adjustment unit 80 includes a phase error detector 81, a free run counter 84, a frequency error detector 86, and a counter setting unit 88.

The phase error detector 82 receives the reference signal REF and the back electromotive detection signal BEMF_EDGE. The phase error detector 82 detects the phase error $\Delta\phi$ of the two signals and outputs a phase error signal PE indicating the phase error $\Delta\phi$. The phase error signal PE may be a value obtained by counting the time of the phase error $\Delta\phi$ with the system clock CK.

The pulse adjustment unit 80 has a function of detecting the revolution of the motor 110, that is, the frequency (cycle time) of the back electromotive detection signal BEMF_EDGE. The detection of the frequency of the back electromotive detection signal BEMF_EDGE is executed by the free run counter 84 and the frequency error detector 86.

The free run counter 84 receives the system clock CK, and operates at the same cycle as the modulation counter 62. The free run counter 84 repeats count-up or count-down at the same cycle without being set, as opposed to the modulation counter 62.

The frequency error detector 86 receives the back electromotive detection signal BEMF_EDGE and the count value FRCNT of the free run counter 84. The frequency error detector 86 monitors the count value of the free run counter 84 at the time the back electromotive detection signal BEMF_EDGE becomes high level every time. The $i^{th}$ (i is an arbitrary natural number) count value is written as P[i].

The frequency error detector 86 calculates, every time, a difference between the count value P[i] for this time and the count value P[i-1] of the free run counter 84 at the time the back electromotive detection signal becomes a predetermined level at the previous $(i-1)^{th}$ time as:

$$\Delta P[i]=P[i]-P[i-1]$$

The difference $\Delta P$ of the count value P[i] is data indicating the fluctuation in cycle time, that is, fluctuation in frequency of the back electromotive detection signal BEMF_EDGE.

The frequency error detector 86 calculates the difference between the difference $\Delta P[i]$ for this time and the difference $\Delta P[i-1]=P[i-1]-P[i-2]$ of the previous time $$\delta F[i]=\Delta P[i]-\Delta P[i-1]$$

δF[i] is data indicating the error of the frequency of the back electromotive detection signal BEMF_EDGE, that is, error of the cycle time. δF[i] is hereinafter referred to as frequency error data. The frequency error data δF[i] is data indicating the error of the frequency (cycle time) with number of pulses of the system clock CK.

When the motor 110 rotates at a constant revolution, the time interval the back electromotive detection signal BEMF_EDGE becomes high level is constant. Therefore, when the revolution of the motor 110 is constant, the count value P[i] increases (or decreases) at a predetermined width for every rotation, and δF[i]=ΔP[i]−ΔP[i−1] becomes a constant value. δF[i] increases (or decreases) if the revolution of the motor 110 rises, and δF[i] decreases (or increases) if the revolution of the motor 110 lowers. For instance, suppose the count values for four continuous times are P[i−2]=8, P[i−1]=12, P[i]=16, P[i+1]=18, P[i+2]=22. At this time, each difference is, $\Delta P[i-1]=4$ $\Delta P[i]=4$ $\Delta P[i+1]=2$ $\Delta P[i+2]=4$; and $\delta F[i]=0$ $\delta F[i+1]=-2$ $\delta F[i+2]=2$.

The counter setting unit 88 sets the modulation counter 62 at the timing same as the previous time when δF[i] is zero, delays the timing of setting than the previous time when δF[i] is negative, and advances the timing of setting than the previous time when δF[i] is positive.

More specifically, the counter setting unit 88 sets the timing same as the previous time when δF[i]=0. When δF[i+1]=−2, the counter setting unit 88 advances the timing of setting by two clocks of the system clock CK from the timing of setting of the previous time. When δF[i+1]=2, the counter setting unit 88 delays the timing of setting for two clocks from the timing of setting of the previous time.

The counter setting unit 88 adjusts the timing to set the modulation counter 62 according to the phase error data PE. As described above, the phase error data PE indicates the phase error Δϕ of the back electromotive detection signal BEMF_EDGE and the reference signal REF with the number of system clocks CK. For instance, if the back electromotive detection signal BEMF_EDGE is delayed from the reference signal REF by m (m is an integer) clocks of the system clock CK, the timing of setting the modulation counter 62 is delayed by the number m of clocks. If the back electromotive detection signal BEMF_EDGE is ahead from the reference signal REF by m (m is an integer) clocks of the system clock CK, the timing of setting the modulation counter 62 is advanced by the number m of clocks.

That is, the counter setting unit 88 receives the frequency error data δF[i] and the phase error data PE, and sets the modulation counter 62 at the timing corresponding to the two values. The counter setting unit 88 adds the frequency error data δF and the phase error data PE and determines the timing of setting the modulation counter 62 according to the addition result.

The phase error Δϕ approaches zero according to the process of the pulse adjustment unit 80, and feedback is applied so that the frequency of the PWM signal Spwm becomes integral multiples of the frequency of the back electromotive detection signal BEMF_EDGE.

The operation of the motor drive circuit 100 will be described in detail with reference to FIGS. 10A to 10H. The vertical axis and the horizontal axis of the figure, and each waveform are shown in a simplified manner for easy understanding, and the frequency and the amplitude are different from the actual waveform.

At before time t0 is the non-detection period, and the power supply voltage Vdd and the ground voltage are alternately applied to the coil of U phase. At time t0, the detection of the zero crossing point is instructed by the window generation unit 40, and the coil Lu of U phase is set to high impedance. In the timing chart of the figure, time t0 and time t2 are the timing of setting of the modulation counter 62, and the zone t0 to t2 are corresponded to one cycle of the back electromotive detection signal BEMF_EDGE.

FIGS. 10A and 10B will be referenced. The count value CNT of the modulation counter 62 becomes a saw-tooth wave of cycle Tx. The torque control unit 68 compares the count value CNT with the value of the target torque signal TRQ, and generates the PWM signal Spwm that becomes high level when TRQ>CNT and low level when TRQ<CNT. The duty ratio (Ton/Tx) of the PWM signal Spwm becomes larger the lower the target torque signal TRQ, and the motor 110 is driven at high torque.

As shown in FIG. 10C, the mask signal MSK generated by the mask signal generation unit 66 becomes low level during the detection period Tdet in the ON time Ton of the PWM signal Spwm. As shown in FIG. 10D, the reference signal REF becomes high level after a predetermined time τ has elapsed after the modulation counter 62 is set and count-up is started. FIGS. 10E to 10G show generation of the back electromotive detection signal BEMD_EDGE by the phase adjustment unit 70. The back electromotive detection signal BEMF_EDGE becomes high level at time t1 and time t3.

The phase error detector 82 detects the phase error Δϕ of the back electromotive detection signal BEMF_EDGE and the reference signal REF shown in FIGS. 10G and 10D, and generates a phase error signal PE corresponding to the phase error Δϕ.

FIG. 10H shows the count value FRCNT of the free run counter 84. The count value at time t1, t3 at which the back electromotive detection signal BEMF_EDGE becomes high level is indicated as P[i−1], P[i]. The frequency error detector 86 monitors the count value P[i] for every cycle, and calculates the difference ΔP[i] with the previous count value P[i−1]. The frequency error detector 86 calculates the frequency error δF of the calculated difference ΔP[i] and the previous difference ΔP[i−1].

The counter setting unit 88 changes the timing of setting the modulation counter 62 in the next cycle according to the frequency error δF[i] and the phase error Δϕ. As a result, the feedback is applied so that the phase error Δϕ approaches zero and the frequency of the PWM signal Spwm becomes integer multiples of the back electromotive detection signal BEMF_EDGE, and the phase and the frequency of the PWM signal Spwm are adjusted.

An integer number of saw-tooth waves are contained at the cycle of time t0 to t2 by the process of the pulse adjustment unit 80. The cycle of the saw-tooth wave immediately before time t2 is smaller than Tx, but is still one saw-tooth wave. In other words, a state in which the frequency of the PWM signal Spwm is an integer multiples of the frequency of the back electromotive detection signal BEMF_EDGE is realized by creating a state in which the saw-tooth wave that increases over the cycle of the back electromotive detection signal BEMF_EDGE does not exist.

The configuration and the operation of the motor drive circuit 100 according to the second embodiment has been described. According to the motor drive circuit 100 of the present embodiment, the timing at which the back electromotive detection signal BEMF_EDGE becomes high level, that is, the timing at which the zero crossing point is generated can be coincided with a predetermined reference timing. Therefore, the back electromotive detection can be reliably performed with small delay by providing a detection timing (detection period Tdet in the embodiment) in the time zone including the reference timing. The rotation of the motor 110 can be controlled with high accuracy by performing the back electromotive detection at high accuracy.

From another standpoint, the motor drive circuit 100 according to the present embodiment drives the motor so that the zero crossing point is generated at the timing of performing the detection instead of performing the back electromotive detection according to the timing at which the zero crossing point is generated. As a result, the zero crossing point is prevented from being generated at an unintended timing, and the detection from being delayed, whereby an accurate detection can be realized.

Third Embodiment

Figure 11:
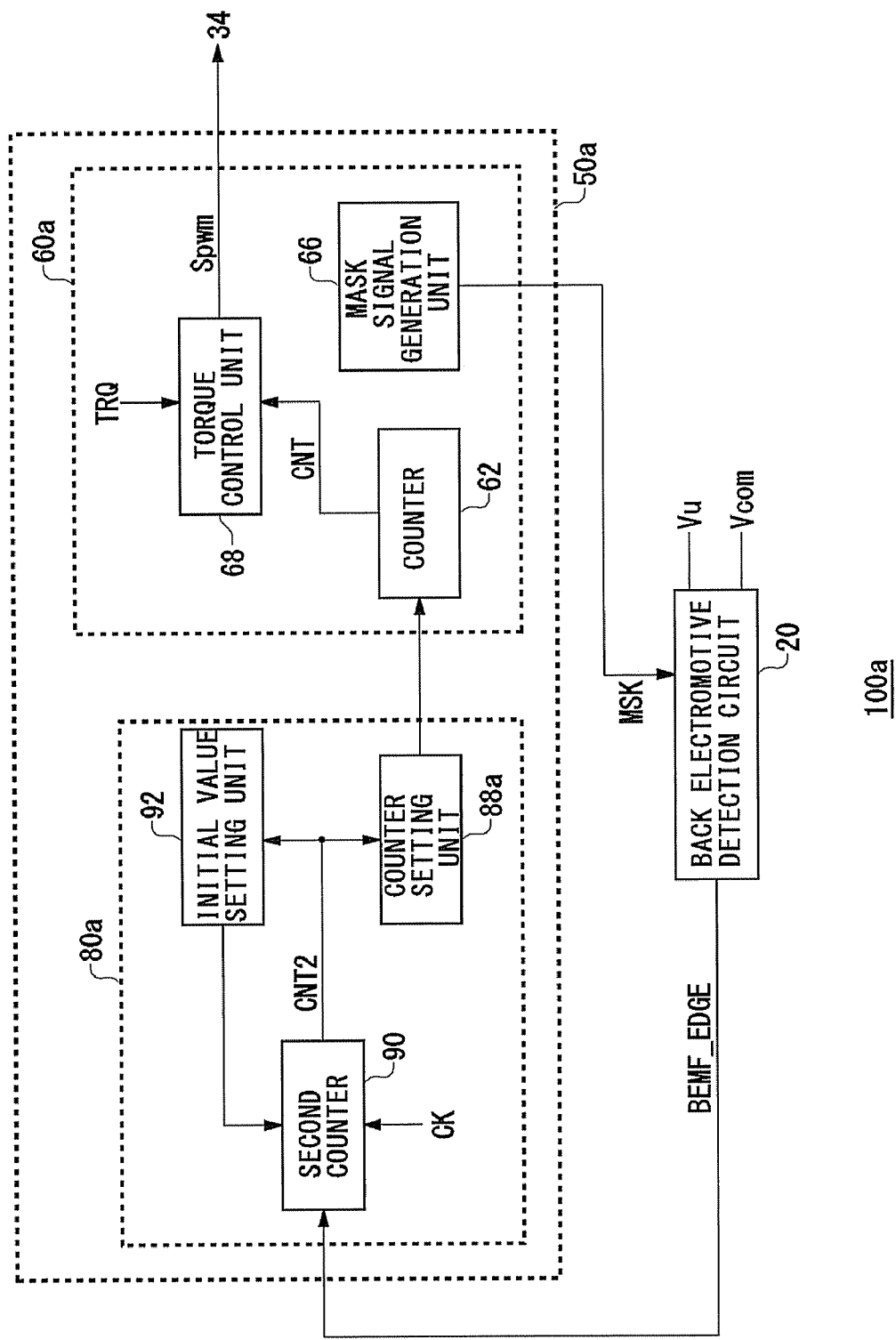
FIG. 11 is a block diagram showing a configuration of a PWM signal generation unit according to a third embodiment.

FIG. 11 is a block diagram showing a configuration of the PWM signal generation unit 50 according to the third embodiment. FIGS. 12A to 12G are timing charts showing the waveform of each signal generated by the back electromotive detection circuit 20 and the PWM signal generation unit 50 of FIG. 11.

Similar to the PWM signal generation unit 50 of FIG. 9, the PWM signal generation unit 50a of FIG. 11 also adjusts the duty ratio and the phase of the PWM signal Spwm through feedback at a timing the back electromotive detection signal BEMF_EDGE becomes high level, that is, with the frequency (cycle) as the feedback amount. This feedback will be described below.

The PWM signal generation unit 50a of FIG. 11 includes a pulse generation unit 60a, and a pulse adjustment unit 80a.

The pulse generation unit 60a corresponds to the pulse generation unit 60 of FIG. 9. The pulse generation unit 60a slices the cycle signal of saw-tooth waveform having a predetermined frequency at a value corresponding to the target torque TRQ of the multi-phase motor. Specifically, the modulation counter 62 repeats the count-up or count-down operation from the initial value at a predetermined cycle shorter than the back electromotive detection signal BEMF_EDGE. That is, the count value CNT of the modulation counter 62 becomes a cycle signal that transitions to saw-tooth waveform. The torque control unit 68 generates the PWM signal Spwm in which the high level and the low level transition according to the magnitude relation of the count value of the modulation counter 62 and the value of the torque signal TRQ indicating the target torque.

The pulse adjustment unit 80a receives the back electromotive detection signal BEMF_EDGE from the back electromotive detection circuit 20, and changes the phase of the count value CNT or the cycle signal in the pulse generation unit 60a according to the timing the back electromotive detection signal BEMF_EDGE becomes a predetermined level (high level).

To realize such function, the pulse adjustment unit 80a sets the modulation counter 62 to an initial value x according to the timing the back electromotive detection signal BEMF_EDGE becomes a predetermined level (high level).

The pulse adjustment unit 80a includes a second counter 90, an initial value setting unit 92, and a counter setting unit 88a.

The second counter 90 is set to an initial value set by the initial value setting unit 92 for every timing the back electromotive detection signal BEMF_EDGE becomes a predetermined level (high level), and starts the counting operation. The second counter 90 may be a count up or a count down counter, but the count down operation will be described herein. An analog circuit using charge/discharge of a capacitor may be used in place of the counter.

The initial value setting unit 92 monitors the count value CNT2 of the second counter 90. The initial value setting unit 92 acquires amount of change ΔCNT2 of the count value CNT2 from when the back electromotive detection signal BEMF_EDGE becomes high level until the back electromotive detection signal BEMF_EDGE becomes high level the next time. The initial value setting unit 92 sets the acquired amount of change ΔCNT2 as the initial value x in the next setting of the second counter 90.

The counter setting unit 88a sets the modulation counter 62 every time the count value CNT2 of the second counter 90 becomes a predetermined value z.

The configuration of the PWM signal generation unit 50a of FIG. 11 is as described above. According to such configuration, the feedback is applied so that the cycle (frequency) of the back electromotive detection signal BEMF_EDGE, that is, the amount of change ΔCNT2 of the count value CNT2 converges to a constant value. That is, the initial value x in time of setting the second counter 90 converges to a constant value.

In a state the loop is stabilized by feedback, the timing the back electromotive detection signal BEMF_EDGE becomes high level, that is, the timing of zero crossing converges to the timing the count value CNT2 becomes zero since the initial value x in time of setting converges to a constant value.

The timing of setting the modulation counter 62 is the timing the count value CNT2 of the second counter 90 becomes a predetermined value z, and thus the interval τ from the timing (CNT2=Z) the modulation counter 62 is set to the timing (CNT2=0) the zero crossing is generated converges to a constant value. Therefore, according to the PWM signal generation unit 50a of FIG. 11, the timing of zero crossing can be converged to a timing of after elapse of a predetermined time τ from the timing of setting the modulation counter 62.

The operation of the motor drive circuit 100 will be described in detail with reference to FIGS. 12A to 12G. The vertical axis and the horizontal axis of the figure, and each waveform are shown in a simplified manner for easy understanding, and the frequency and the amplitude are different from the actual waveform.

At before time t0 is the non-detection period, and the power supply voltage Vdd and the ground voltage are alternately applied to the coil of U phase. At time t0, the detection of the zero crossing point is instructed by the window generation unit 40, and the coil Lu of U phase is set to high impedance. In the timing chart of the figure, time t0 and time t2 are the timing of setting of the modulation counter 62, and the zone t0 to t2 are corresponded to one cycle of the back electromotive detection signal BEMF_EDGE.

FIGS. 12D to 12F show the generation of the back electromotive detection signal BEMF_EDGE by the phase adjustment unit 70. The back electromotive detection signal BEMF_EDGE becomes high level at time t1 and time t3.

FIG. 12G shows the count value CNT2 of the second counter 90. The second counter 90 is a down counter, and performs count down for every clock CK from the initial value x. The counter setting unit 88a sets the modulation counter 62 at time t0 and time t2 at which the count value CNT2 reaches a predetermined value z. The opposite operation is performed if the second counter 90 is an up counter.

The initial value setting unit 92 acquires the amount of change ΔCNT2(=x1−y1) of the count value CNT2 of the second counter 90 of when the count value CNT2 changes from the time of setting at time t1 until when the back electromotive detection signal BEMF_EDGE becomes high level the next time. The amount of change ΔCNT2 corresponds to the cycle of the back electromotive detection signal BEMF_EDGE. The initial value setting unit 92 sets the acquired amount of change ΔCNT2 as the initial value x2 of the second counter 90 at time t3 or the timing of the next setting of the second counter 90.

An integer number of saw-tooth waves (cycle signal) are contained at the cycle of time t0 to t2 by the process of the pulse adjustment unit 80a. The cycle of the saw-tooth wave immediately before time t2 is smaller than Tx, but is still one saw-tooth wave. In other words, a state in which the frequency of the PWM signal Spwm is an integer multiples of the frequency of the back electromotive detection signal BEMF_EDGE is realized by creating a state in which the saw-tooth wave that increases over the cycle of the back electromotive detection signal BEMF_EDGE does not exist.

According to the PWM signal generation unit 50a of FIG. 11, the timing of zero crossing, that is, the timing (time t3) the back electromotive detection signal BEMF_EDGE becomes high level converges to the timing the count value CNT2 of the second counter 90 becomes zero. The timing (time t2) the second counter 90 is set is the timing the count value CNT2 becomes a predetermined value z. Therefore, the period τ of time t2 and time t3 converges to a constant value (z×Tck) corresponding to the predetermined value z. Tck is the cycle of the clock CK input to the second counter 90.

Therefore, according to the PWM signal generation unit 50a, the timing of zero crossing point can be coincided with the reference timing of after elapse of a predetermined time τ from the timing of setting of the second counter 90. Therefore, the zero crossing point can be accurately detected with small delay by setting the timing of detecting the zero crossing point near the reference timing.

The configuration and the operation of the motor drive circuit 100 according to the first and third embodiments has been described. According to the motor drive circuit 100 of the present embodiment, the timing at which the back electromotive detection signal BEMF_EDGE becomes high level, that is, the timing at which the zero crossing point is generated can be coincided with a predetermined reference timing. Therefore, the back electromotive detection can be reliably performed with small delay by providing a detection timing (detection period Tdet in the embodiment) in the time zone including the reference timing. The rotation of the motor 110 can be controlled with high accuracy by performing the back electromotive detection at high accuracy.

Figure 13:
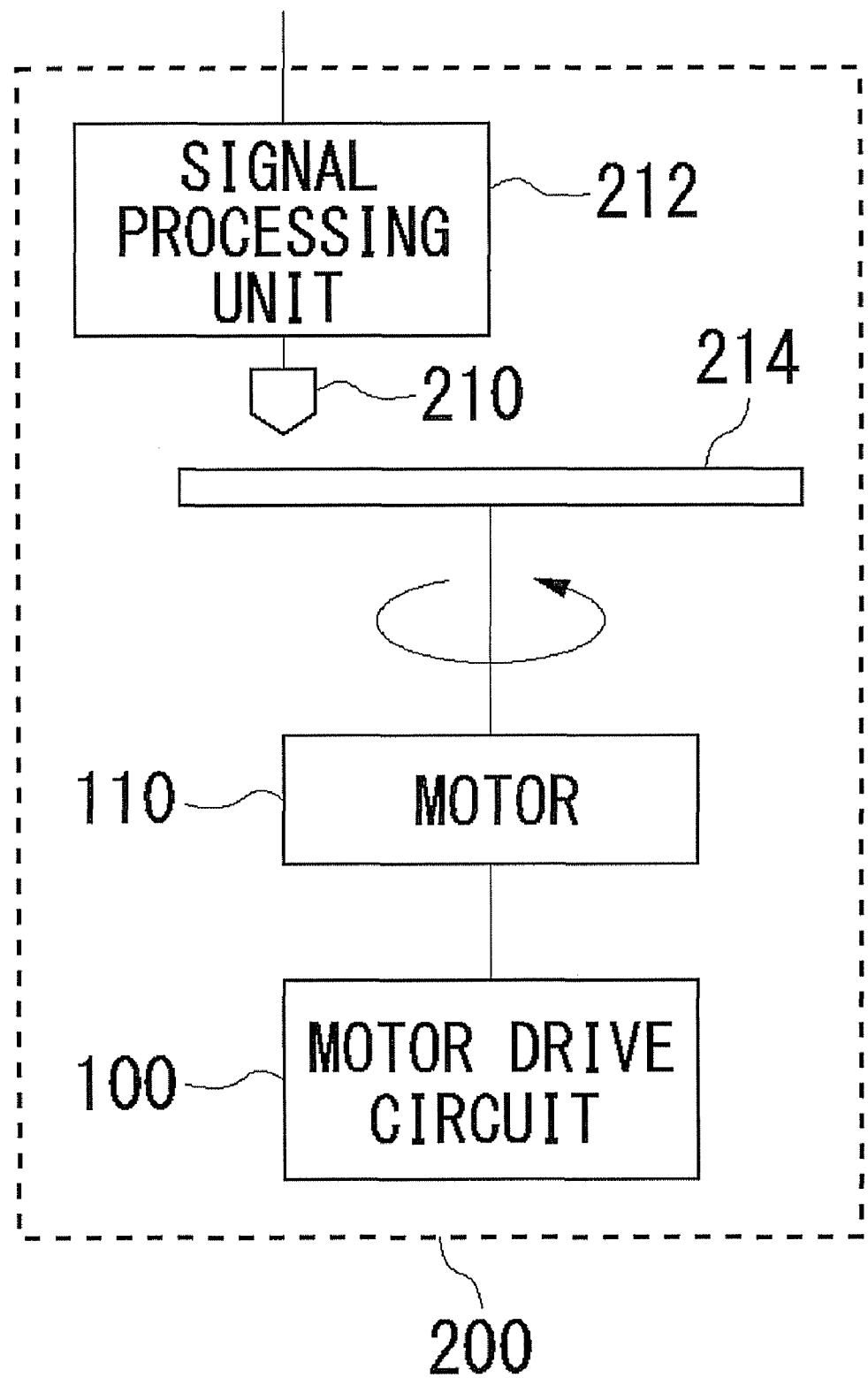
FIG. 13 is a block diagram showing a configuration of a disc apparatus mounted with the motor drive circuit of FIG. 7.

Lastly, an example of the application of the motor drive circuit 100 will be described. FIG. 13 is a block diagram showing a configuration of a disc apparatus 200 mounted with the motor drive circuit 100 of FIG. 7. The disc apparatus 200 is a unit for performing recording and reproducing process on an optical disc such as CD and DVD, and is mounted on a CD player and a DVD player, and an electronic equipment such as personal computer. The disc apparatus 200 includes the pickup 210, the signal processing unit 212, the disc 214, the motor 110, and the motor drive circuit 110.

The pickup 210 writes the desired data by irradiating laser onto the disc 214, or reads the data written on the disc 214 by reading the reflected light. The signal processing unit 212 performs necessary signal processing such as amplification process, A/D conversion, or D/A conversion on the data read/written through the pickup 210. The motor 110 is a spindle motor provided to rotate the disc 214. Miniaturization is particularly demanded on the disc apparatus 200 shown in FIG. 13, and thus a sensorless type that does not use Hall element etc. is used for the motor 110. The motor drive circuit 100 according to the present embodiment is suitably used to stably drive the sensorless spindle motor.

The present invention has been described based on the embodiment. This embodiment is illustrative, and it should be recognized by those skilled in the art that various modifications may be considered for the combination of each component and each processing process, and that such modifications are encompassed within the scope of the present invention.

In the embodiment, a case of driving a three phase motor has been described, but the present invention can be suitably used in driving a sensorless motor other than of three phases. The motor may be a five phase motor. In the embodiment, a case of detecting the zero crossing point by comparing the back electromotive voltage Vu of the U phase with the middle point voltage Vcom has been described, but the present invention is not limited thereto. The back electromotive detection circuit 20 may be provided for each of the U phase, the V phase, and the W phase to generate the back electromotive detection signal BEMF_EDGE.

When the revolution (torque) of the motor 110 in a stationary state is fixed, the revolution of the motor does not need to be monitored, and thus the free run counter 84 and the frequency error detector 86 can be omitted. In this case, the counter setting unit 88 sets the timing of setting the modulation counter 62 based on the value of the torque signal TRQ instructing the revolution of the motor 110.

In the embodiment, the zero crossing point is detected by detecting a state of Vu>Vcom in the process of rise of the phase voltage Vu, but the present invention is not limited thereto, and the back electromotive detection circuit 20 can detect the zero crossing point by detecting a state of Vu<Vcom in the process of lowering of the phase voltage Vu.

In the embodiment, the detection timing of the zero crossing point is set by coinciding the detection period Tdet defined by the mask signal MSK with the timing of the reference signal REF, but the present invention is not limited thereto. For instance, the mask signal MSK may not be generated and the AND gate 23 of FIG. 9 may be omitted. In this case, the system clock CK to be input to the clock terminal of the flip-flop 24 of FIG. 9 may be input to the flip-flop 24 only around the reference signal REF.

In the embodiment, a case of driving the motor through the PWM method of 180 degrees conduction has been described, but the present invention is not limited thereto, and may be used in a motor drive circuit widely adopting the pulse modulation method.

The setting of logic of high level and low level of the signal described in the embodiment is an example, and various variants can be considered for the configuration of the logic circuit block, which variants are also encompassed in the scope of the present invention.

In the embodiment, a case of realizing the present invention with the digital circuit has been described, but the digital circuit may be partially or entirely replaced with the analog circuit having the same function.

While the preferred embodiments of the present invention have been described using specific terms, such description is for illustrative purposes only, and it is to be understood that changes and variations may be made without departing from the spirit or scope of the appended claims.

What is claimed is:

1. A motor drive circuit which supplies drive current and drives a multi-phase motor, the motor drive circuit comprising:
   a plurality of switching circuits provided for respective coils of the multi-phase motor and operative to apply a voltage of high level or low level to one end of the coil;
   a pulse modulation signal generation unit which generates a pulse modulation signal whose duty ratio changes according to a target torque of the multi-phase motor, and outputs a reference signal that becomes a predetermined level at a predetermined timing;
   a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point;
   a switching control unit which receives the pulse modulation signal from the pulse modulation signal generation unit and the back electromotive detection signal from the back electromotive detection circuit, and switch controls at least one of a high side switch or a low side switch contained in the switching circuit to be driven based on the back electromotive detection signal; and
   a pulse adjustment unit which adjusts a frequency of the pulse modulation signal based on the reference signal and the back electromotive detection signal.

2. The motor drive circuit, wherein
   the pulse adjustment unit includes:
   a phase adjustment unit which compares phases of the reference signal and the back electromotive detection signal, and adjusts the duty ratio of the pulse modulation signal so that a phase error of the two signals becomes a minimum; and
   a frequency adjustment unit which adjusts a frequency of the pulse modulation signal so that the frequency of the pulse modulation signal becomes integral multiples of the frequency of the back electromotive detection signal.

3. The motor drive circuit according to claim 2,
   wherein
   the phase adjustment unit includes:
   a phase error detector which detects the phase error of the reference signal and the back electromotive detection signal; and
   a torque adjustment unit which reflects the phase error detected by the phase error detector on the target torque.

4. The motor drive circuit according to claim 3,
   wherein
   the pulse modulation signal generation unit includes a counter which repeats a count-up or a count-down operation at a predetermined cycle shorter than a cycle of the back electromotive detection signal, and generates the pulse modulation signal whose level transitions according to a magnitude relation of a count value by the counter and a value of a torque signal indicating the target torque; and
   the frequency adjustment unit set operates the counter so that the frequency of the pulse modulation signal becomes integral multiples of the revolution of the motor.

5. The motor drive circuit according to claim 4,
   wherein
   the frequency adjustment unit includes:
   a free run counter which operates at a cycle same as the counter;
   a frequency error detector which monitors a count value P[i] of the free run counter at a time the back electromotive detection signal becomes a predetermined level in the $i^{th}$ (i is an arbitrary natural number) time, calculates every time a difference $\Delta P[i]=P[i]-P[i-1]$ with a count value P[i−1] of the free run counter at a time the back electromotive detection signal becomes a predetermined level in the previous $(i-1)^{th}$ time, and calculates a frequency error $\delta F[i]=\Delta P[i]-\Delta P[i-1]$ indicated by a current difference $\Delta P[i]$ and the previous difference $\Delta P[i-1]=P[i-1]-P[i-2]$; and
   a counter setting unit which sets the counter at a timing based on the frequency error $\delta F[i]$ calculated by the frequency error detector.

6. The motor drive circuit according to claim 1, further comprising:
   a mask signal generation unit which generates a mask signal that becomes a predetermined level and validates a detection of a zero crossing point by the back electromotive detection circuit during a detection period in an ON period in which the pulse modulation signal is at a level indicating an ON state of at least one of the high-side switch and the low-side switch contained in the switching circuit; and
   a reference signal generation unit which generates the reference signal that becomes the predetermined level during the detection period the detection of the zero crossing point is validated by the mask signal.

7. A motor drive method of supplying drive current and driving a multi-phase motor; the method comprising:
   generating a pulse modulation signal whose duty ratio changes according to a target torque of the multi-phase motor;
   detecting a zero crossing point by comparing a back electromotive voltage generated in at least one coil of the multi-phase motor with a middle point voltage of the coil, and generating a back electromotive detection signal that becomes a predetermined level at a timing of the zero crossing point;
   performing sequence control of switching phases to be driven based on the back electromotive detection signal and switch controlling at least one of a high side switch and a low side switch connected to the coil based on the pulse modulation signal;
   generating a reference signal that becomes a predetermined level at a predetermined timing in one cycle of the back electromotive detection signal;
   comparing phases of the back electromotive detection signal and the reference signal and adjusting the duty ratio of the pulse modulation signal by feedback so that a phase error of the two signals becomes a minimum; and
   adjusting a frequency of the pulse modulation signal so that the frequency of the pulse modulation signal becomes integral multiples of the frequency of the back electromotive detection signal.

8. The motor drive circuit according to claim 1,
   wherein
   the pulse adjustment unit compares a timing the back electromotive detection signal becomes the predetermined level with a predetermined reference timing, and adjusts a frequency and a phase of the pulse modulation signal so that a phase error of the two timings becomes a minimum and the frequency of the pulse modulation signal becomes integral multiples of the frequency of the back electromotive detection signal.

9. The motor drive circuit according to claim 8, wherein
the pulse adjustment unit includes:
a frequency error detector which detects a frequency of every time of the back electromotive detection signal, and generates frequency error data corresponding to the error; and
a phase error detector which detects a phase error of a timing at which the back electromotive detection signal becomes the predetermined level and the predetermined reference timing, and generates phase error data corresponding to the phase error, and
the frequency and the phase of the pulse modulation signal are adjusted based on the frequency error data and the phase error data.

10. The motor drive circuit according to claim 9, wherein
the pulse modulation signal generation unit includes a modulation counter which repeats a count-up or a count-down operation at a predetermined cycle shorter than a cycle of the back electromotive detection signal, and slices a count value by the modulation counter with a value of a torque signal indicating the target torque; and
the pulse adjustment unit includes a counter setting unit which sets the modulation counter at a timing based on the frequency error data and the phase error data.

11. The motor drive circuit according to claim 10, wherein
the pulse adjustment unit further includes a free run counter which operates at a cycle same as the modulation counter; and
the frequency error detector monitors a count value $P[i]$ of the free run counter at a time the back electromotive detection signal becomes a predetermined level in the $i^{th}$ (i is an arbitrary natural number) time, calculates every time a difference $\Delta P[i]=P[i]-P[i-1]$ with a count value $P[i-1]$ of the free run counter at a time the back electromotive detection signal becomes a predetermined level in the previous $(i-1)^{th}$ time, and outputs a frequency error $\delta F[i]=\Delta P[i]-\Delta P[i-1]$ indicated by a current difference $\Delta P[i]$ and the previous difference $\Delta P[i-1]=P[i-1]-P[i-2]$ as the frequency error data.

12. The motor drive circuit according to claim 8, further comprising:
a mask signal generation unit which generates a mask signal that becomes a predetermined level and validates a detection of a zero crossing point by the back electromotive detection circuit during a detection period in an ON period in which the pulse modulation signal is at a level indicating an ON state of at least one of the high-side switch and the low-side switch contained in the switching circuit; and
a reference signal generation unit which generates the reference signal that becomes the predetermined level during the detection period the detection of the zero crossing point is validated by the mask signal, and defines the reference timing, wherein
the pulse adjustment unit detects a phase error of the back electromotive detection signal and the reference signal, and generates phase error data corresponding to the phase error.

13. A motor drive circuit which supplies drive current and drives a multi-phase motor, the motor drive circuit comprising:

a plurality of switching circuits provided for respective coils of the multi-phase motor and operative to apply a voltage of high level or low level to one end of the coil;
a pulse modulation signal generation unit which generates a pulse modulation signal whose duty ratio changes according to a target torque of the multi-phase motor;
a back electromotive detection circuit which detects a zero crossing point by comparing a back electromotive voltage generated in at least one coil of the multi-phase motor with a middle point voltage of the coil, and outputs a back electromotive detection signal that becomes a predetermined level at a timing of the zero crossing point;
a switching control unit which receives the pulse modulation signal from the pulse modulation signal generation unit and the back electromotive detection signal from the back electromotive detection circuit, and performs sequence control of switching phases to be driven based on the back electromotive detection signal and switch controls at least one of a high side switch and a low side switch contained in the switching circuit to be driven based on the pulse modulation signal; and
a pulse adjustment unit which receives the back electromotive detection signal from the back electromotive detection circuit and change the phase of the pulse modulation signal according to the timing the back electromotive detection signal becomes the predetermined level.

14. The motor drive circuit according to claim 13, wherein
the pulse modulation signal generation unit slices a cycle signal of a predetermined frequency with a value corresponding to the target torque of the multi-phase motor, and generates the pulse modulation signal whose duty ratio changes; and
the pulse adjustment unit changes the phase of the cycle signal according to the timing the back electromotive detection signal becomes the predetermined level.

15. The motor drive circuit according to claim 14, wherein
the pulse modulation signal generation unit includes a modulation counter which repeats a count-up or a count-down operation at a predetermined cycle shorter than a cycle of the back electromotive detection signal, and sets a level of the pulse modulation signal according to a magnitude relation of a count value by the modulation counter and a value of a torque signal indicating the target torque; and
the pulse adjustment unit includes a counter setting unit which sets the modulation counter according to a timing the back electromotive detection signal becomes the predetermined level.

16. The motor drive circuit according to claim 15, wherein
the pulse adjustment unit further includes,
a second counter which is set for every timing the back electromotive detection signal becomes the predetermined level and which starts counting; and
an initial value setting unit which monitors the second counter, acquires amount of change in the count value of the second counter from when the back electromotive detection signal becomes the predetermined level until the back electromotive detection signal becomes the predetermined level the next time, and sets the acquired value to an initial value in the next setting of the second counter, wherein the counter setting unit sets the modulation counter every time the count value of the second counter becomes a predetermined value.

17. A disc apparatus comprising:
a spindle motor which rotates a disc; and
the motor drive circuit according to claim 1 which drives the spindle motor.

18. A motor drive method of supplying drive current and driving a multi-phase motor; the method comprising:
generating a pulse modulation signal whose duty ratio changes according to a target torque of the multi-phase motor;
detecting a zero crossing point by comparing a back electromotive voltage generated in at least one coil of the multi-phase motor with a middle point voltage of the coil, and generating a back electromotive detection signal that becomes a predetermined level at a timing of the zero crossing point;
performing sequence control of switching phases to be driven based on the back electromotive detection signal and switch controlling at least one of a high side switch and a low side switch connected to the coil based on the pulse modulation signal;
comparing a timing the back electromotive detection signal becomes the predetermined level with a predetermined reference timing, and adjusting the frequency and the phase of the pulse modulation signal so that a phase error of the two timings becomes a minimum and the frequency of the pulse modulation signal becomes integral multiples of the frequency of the back electromotive detection signal.

19. A motor drive method of supplying drive current and driving a multi-phase motor; the method comprising:
slicing a cycle signal of a predetermined frequency with a value corresponding to a target torque of the multi-phase motor, and generating a pulse modulation signal whose duty ratio changes;
detecting a zero crossing point by comparing a back electromotive voltage generated in at least one coil of the multi-phase motor with a middle point voltage of the coil, and generating a back electromotive detection signal that becomes a predetermined level at a timing of the zero crossing point;
performing sequence control of switching phases to be driven based on the back electromotive detection signal and switch controlling at least one of a high side switch and a low side switch connected to the coil based on the pulse modulation signal; and
receiving the back electromotive detection signal, and changing a phase of the cycle signal according to a timing the back electromotive detection signal becomes the predetermined level.

* * * * *

UNITED STATES PATENT AND TRADEMARK OFFICE
CERTIFICATE OF CORRECTION

| | | |
|---|---|---|
| PATENT NO. | : 7,855,521 B2 | Page 1 of 1 |
| APPLICATION NO. | : 12/048399 | |
| DATED | : December 21, 2010 | |
| INVENTOR(S) | : Yoshito Otaguro | |

It is certified that error appears in the above-identified patent and that said Letters Patent is hereby corrected as shown below:

On the Title Page of the Patent, Item (75) Inventor: This patent currently names "Yoshitaka Otaguro" as inventor. Pursuant to a Request to Correct Inventorship filed with the United States Patent and Trademark Office on February 25, 2011, the name "Yoshitaka Otaguro" should be deleted and replaced with the name "Yoshito Otaguro" as Inventor.

Signed and Sealed this
Twenty-ninth Day of March, 2011

David J. Kappos
*Director of the United States Patent and Trademark Office*